United States Patent
Ishigame et al.

(10) Patent No.: US 8,292,356 B2
(45) Date of Patent: Oct. 23, 2012

(54) LOWER VEHICLE-BODY STRUCTURE OF VEHICLE

(75) Inventors: Katsuyoshi Ishigame, Hiroshima (JP); Yuichi Sugimura, Hiroshima (JP); Masaki Motoki, Hiroshima (JP); Yukari Fujii, Hiroshima (JP); Akihiro Yukimori, Hiroshima (JP); Yoshikazu Nishimura, Hiroshima (JP); Kohei Kirita, Hiroshima (JP); Katsumi Ejima, Hiroshima (JP); Keizo Kawasaki, Hiroshima (JP)

(73) Assignee: Mazda Motor Corporation (JP)

( * ) Notice: Subject to any disclaimer, the term of this patent is extended or adjusted under 35 U.S.C. 154(b) by 262 days.

(21) Appl. No.: 12/704,099

(22) Filed: Feb. 11, 2010

(65) Prior Publication Data

US 2010/0237659 A1    Sep. 23, 2010

(30) Foreign Application Priority Data

Mar. 17, 2009  (JP) .................. 2009-063734
Mar. 26, 2009  (JP) .................. 2009-075409
Mar. 27, 2009  (JP) .................. 2009-079545
Apr. 20, 2009  (JP) .................. 2009-102238

(51) Int. Cl.
*B60N 99/00* (2006.01)

(52) U.S. Cl. .......... 296/203.01; 296/193.05; 296/193.07
(58) Field of Classification Search ............. 296/187.03, 296/187.12, 193.01, 193.05, 193.06, 193.07, 296/203.01, 203.03

See application file for complete search history.

(56) References Cited

U.S. PATENT DOCUMENTS

| 6,702,368 B1* | 3/2004 | Hanyu ............... 296/193.06 |
| 6,988,763 B2* | 1/2006 | Saeki ................ 296/187.12 |
| 7,264,302 B2* | 9/2007 | Nagashima ............ 296/187.12 |
| 2001/0019216 A1* | 9/2001 | Kobayashi ............ 296/204 |
| 2002/0185245 A1* | 12/2002 | Handa .................. 164/92.1 |
| 2005/0023862 A1 | 2/2005 | Saeki |
| 2005/0046238 A1* | 3/2005 | Miyoshi et al. ........ 296/203.03 |
| 2006/0158008 A1 | 7/2006 | Nagashima |
| 2008/0315628 A1* | 12/2008 | Obayashi ............ 296/193.06 |
| 2010/0038928 A1* | 2/2010 | Onuma .............. 296/187.12 |

FOREIGN PATENT DOCUMENTS

EP    0 799 757 A1    10/1997

OTHER PUBLICATIONS

Extended European Search Report dated May 18, 2010; Application No. 10001959.5-2425.

* cited by examiner

*Primary Examiner* — Lori Lyjak
(74) *Attorney, Agent, or Firm* — Studebaker & Brackett PC; Donald R. Studebaker

(57) ABSTRACT

A reinforcing member is provided at a lower-outside corner of a side-sill reinforcement so as to extend in the vehicle longitudinal direction including a connection portion of the side sill to a center pillar for straining deformation of the corner. A deformation promoting portion which is provided at an upper portion of the side-sill reinforcement at a specified position which corresponds to the connection portion for prompting deformation of the upper portion of the side-sill reinforcement. Accordingly, a lower vehicle-body structure of a vehicle which can properly restrain the side sill and the center pillar from coming toward the vehicle inside at the vehicle side crash can be provided.

20 Claims, 23 Drawing Sheets

LOWER VEHICLE-BODY STRUCTURE OF VEHICLE

BACKGROUND OF THE INVENTION

The present invention relates to a lower vehicle-body structure of a vehicle which comprises a side sill which extends in a vehicle longitudinal direction, a center pillar which extends in a vertical direction and is connected to the side sill at a lower end thereof, and a side-sill reinforcement which is provided inside the side sill and has a U-shaped cross section opening toward a vehicle inside.

In the conventional lower vehicle-body structure of a vehicle, the lower end of the center pillar extending in the vertical direction is connected to the side sill extending in the vehicle longitudinal direction. According to this conventional lower vehicle-body structure, in case a load of a vehicle side crash is inputted to the center pillar at the vehicle side crash, the crash load is transmitted to a connection portion of the side sill to the center pillar toward the vehicle inside. Thus, there occurs a case in which the connection portion of the side sill to the center pillar moves toward the vehicle inside, so that the side sill may break.

Accordingly, the lower vehicle-body structure of a vehicle disclosed in US Patent Application Publication No. 2006/0158008A1 has been proposed to solve the above-described problem. That is, as shown in FIG. 25, a side sill 204 having a closed cross section, which comprises a side-sill inner 201, a side-sill reinforcement 202, and a side-sill outer 203, is provided so as to extend in the vehicle longitudinal direction, a lower portion of a center-pillar inner 206 of a center pillar 205 extending in the vehicle vertical direction is connected to a connection portion between the side-sill inner 201 and the side-sill reinforcement 202, a lower portion of a center-pillar reinforcement 207 of the center pillar 205 is connected to the side-sill reinforcement 202, and a center-pillar outer 208 of the center pillar 205 is formed integrally with the side-sill outer 203. Further, the side-sill reinforcement 202 has a U-shaped cross section opening toward the vehicle inside, and a reinforcing member 209 is provided at a lower-outside corner 202a of the side-sill reinforcement 202 to restrain the side sill 204 from bending toward the vehicle inside at the vehicle side crash.

In the above-described conventional structure shown in FIG. 25, the bending of the side sill 204 toward the vehicle inside at the vehicle side crash can be prevented, but there is a problem in that the center pillar 205, in particular, its upper portion inclines so greatly that the center pillar 205 would come toward the vehicle inside as shown by two-dotted lines in FIG. 25. This is because in case the center pillar 205 receives the load of the vehicle side crash, a force to fall down the center pillar toward the vehicle inside may occur, and this force may cause a rotational moment applied to the side sill 204.

SUMMARY OF THE INVENTION

An object of the present invention is to provide a lower vehicle-body structure of a vehicle which can properly restrain the side sill and the center pillar from coming toward the vehicle inside at the vehicle side crash.

According to the present invention, there is provided a lower vehicle-body structure of a vehicle, comprising a side sill, a center pillar connected to the side sill at a lower end thereof, a side-sill reinforcement provided inside the side sill, the side-sill reinforcement having a U-shaped cross section opening toward a vehicle inside, a reinforcing member provided at a lower-outside corner of the side-sill reinforcement so as to extend in a vehicle longitudinal direction including a connection portion of the side sill to the center pillar for straining deformation of the corner, and a deformation promoting portion provided at an upper portion of the side-sill reinforcement at a specified position which corresponds to the connection portion for prompting deformation of the upper portion of the side-sill reinforcement. Herein, the above-described deformation promoting portion may be comprised of a weak portion, such as plural slits or openings, or a bending portion to cause buckling.

According to the present invention, since the reinforcing member is provided at the lower-outside corner of the side-sill reinforcement, the side sill can be properly made bend flexibly without breaking against the load of the vehicle side crash inputted via the center pillar, thereby restraining the side sill from coming toward the vehicle inside. Further, since the deformation promoting portion is provided at the upper portion of the side-sill reinforcement at the specified position corresponding to the connection portion, the crash load can be properly absorbed. Moreover, the proper deformation of the lower portion of the center pillar toward the vehicle inside can be ensured by the above-described flexible bending of the side sill, so that the upper portion of the center pillar can be properly restrained from coming toward the vehicle inside.

According to an embodiment of the present invention, the deformation promoting portion is provided within a range of the connection portion of the side-sill reinforcement to the center pillar, and the reinforcing member is provided over a specified range which is longer than the above-described range in the vehicle longitudinal direction. Thereby, since the deformation promoting portion is provided within the range of the connection portion of the side-sill reinforcement to the center pillar, the proper absorption of the crash load at the connection portion can be ensured. Further, since the reinforcing member is provided over the specified range which is longer than the above-described range in the vehicle longitudinal direction, the flexile bending of the side sill can be ensured, thereby restraining the side sill from coming toward the vehicle inside. Thus, both the crash-load absorption of the connection portion and the restraint of the side sill from coming toward the vehicle inside can be achieved.

According to another embodiment of the present invention, the deformation promoting portion comprises a weak portion which is provided at an upper face of the side-sill reinforcement. Herein, the deformation promoting portion may be comprised of plural slits or one or more openings. Thereby, the deformation promotion of the upper portion, in particular, the upper corner of the side-sill reinforcement can be achieved properly.

According to another embodiment of the present invention, the deformation promoting portion comprises a bending portion which is provided at an upper face of the side-sill reinforcement and causes buckling of the upper face of the side-sill reinforcement. Thereby, since the bending portion may cause the buckling of the upper face of the side-sill reinforcement when the crash load is inputted, the deformation promotion of the upper portion, in particular, the upper corner of the side-sill reinforcement can be achieved, thereby absorbing the crash load properly.

According to another embodiment of the present invention, gussets are provided inside the side-sill reinforcement at front and rear positions of the reinforcing member so as to form a node in a cross section of the side-sill reinforcement. Thereby, the strength of portions equipped with the gussets increases, so that the crash load can be surely received by the high-strength portions (gusset-disposition portions), and the reinforcing member can be properly made bend flexibly at its center. Thus, the further proper flexible bending of the side sill can be provided with the reinforcing member and the gussets.

According to another embodiment of the present invention, front and rear cross members extending in a vehicle width direction are provided on a floor panel at front and rear positions which are located in front of and in back of the center pillar, and the reinforcing member is arranged between the front and rear cross members. Thereby, the crash load can be received surely by the front and rear cross members, and the side sill can be properly made bend flexibly by the reinforcing member between these members.

According to another embodiment of the present invention, front and rear gussets are provided inside the side-sill reinforcement at specified positions which correspond to the front and rear cross members so as to form a node in a cross section of the side-sill reinforcement, and the reinforcing member is arranged over a range between the front and rear gussets. Thereby, the crash load can be received further surely by the front and rear cross members and the front and rear gussets, and the side sill can be further properly made bend flexibly by the reinforcing member arranged over the range between the front and rear gussets.

According to another embodiment of the present invention, the reinforcing member is arranged at a central portion between the front and rear cross members. Thereby, the above-described flexible bending of the side sill can be achieved properly even if the longitudinal length of the reinforcement member is rather short.

According to another embodiment of the present invention, a middle cross member extending in a vehicle width direction is provided on a floor panel at a specified position which corresponds to the center pillar. Thereby, the crash-load input via the center pillar at the vehicle side crash is received directly by the middle cross member, thereby restraining the buckling of the side sill properly. Further, since the side-sill reinforcement is configured to crush easily at the deformation promoting portion, the rotational moment (bending moment) caused by the inclination (falling down toward the vehicle inside) of the center pillar may be weakened, so that buckling of the middle cross member can be restrained properly.

According to another embodiment of the present invention, an end of the middle cross member which is located on the side of the side sill is positioned away from the side sill by a specified distance, a connecting member which connects the side-sill-side end of the middle cross member to the side sill is provided, the connecting member has a lower strength compared to the middle cross member, and the strength of a connection area of the connecting member to the middle cross member is higher than that of another connection area of the connecting member to the side sill. Thereby, at the initial stage, the crash load inputted via the center pillar and the side sill is received by the connection area of the connecting member to the side sill which has the lower strength, so that this connection area can crush axially (in the vehicle width direction) absorbing the crash load, thereby absorbing the crash energy properly. After this, against the bending moment from the side sill, the crash load inputted is received by the connection area of the connecting member to the middle cross member which has the higher strength, so that this connection area can crush absorbing the bending load, thereby preventing the load from transmitting to the middle cross member properly. Further, since the middle cross member has the higher strength compared to the connecting member, the strength of the middle cross member is high (large) enough to receive (stand) the inputted crash load. Accordingly, the axial compressive input (inputted load) and the bending input (inputted load) can be absorbed effectively by the connecting member, restraining the buckling of the middle cross member. Moreover, since the proper deformation of the lower portion of the center pillar toward the vehicle inside can be ensured by the axial crushing of the connecting member, so that the upper portion of the center pillar can be properly restrained from coming toward the vehicle inside.

According to another embodiment of the present invention, the connecting member constitutes a seat-attaching bracket to support a seat for passenger. Thereby, the seat-attaching bracket can be utilized as the connecting member properly.

According to another embodiment of the present invention, the side sill includes a side-sill inner, and front and rear gussets are provided inside the side-sill inner at front and rear positions which are located in front of and in back of the middle cross member so as to form a node in a cross section of the side-sill inner. Thereby, since the crash load from the center pillar at the vehicle side crash can be easily transmitted to the middle cross member via the gussets and the side sill inner, the load dispersion can be properly achieved.

According to another embodiment of the present invention, a cross member which extends in a vehicle width direction is provided on a floor panel between a tunnel portion of the floor panel and the side sill, an impact absorbing portion to absorb an impact of a vehicle side crash is formed near an outside connection end of the above-described cross member to the side sill, another reinforcing member is provided near the outside end of the cross member so that an outside end thereof overlaps with the impact absorbing portion. Herein, the impact absorbing portion may be a weak portion, such as a notch or opening, or the above-described reinforcing member may be a nut plate as a seat-attaching member to fix a seat for passenger. According to this embodiment, the crash load can be absorbed by the above-described impact absorbing portion, and the initial increase of the load acting on a body portion of the cross member can be reduced and thereby the buckling of the cross member (a downward-bending deformation of a central portion of the cross member) can be restrained with the above-described overlap structure between the impact absorbing portion and the reinforcing member. Further, the cross member can be properly reinforced against the inputted load from the side sill by the above-described reinforcing member.

According to another embodiment of the present invention, the impact absorbing portion is a notch which is formed in such a manner that an outside corner end of the above-described cross member is cut away. Thereby, the proper forming and processing of the impact absorbing portion can be ensured.

According to another embodiment of the present invention, the above-described reinforcing member which is provided near the outside end of the cross member constitutes a seat-attaching member to fix a seat for passenger. Thereby, the seat-attaching member can be utilized properly as the reinforcing member.

According to another embodiment of the present invention, the lower vehicle-body structure of a vehicle further comprises a pair of rear side frames which is provided behind a pair of the side sills and extends in the vehicle longitudinal direction, and a slant kick-up portion which rises rearward and upward between a front floor panel and a rear floor panel, wherein a front portion of the rear side frame is connected to an inside of the side sill which corresponds to a rear portion of the kick-up portion, and a reinforcing member for restraining a rotation of the side sill is provided on a front portion of the kick-up portion which corresponds to an upper-end side portion of the side sill at a specified position which overlaps with the rear side frame in a plan view. Thereby, since the reinforcing member is provided on the front portion of the kick-up portion which corresponds to the upper-end side portion of the side sill, the inside portion of the side sill which is positioned behind the center pillar is supported even in case the side sill does not have the bending deformation at the vehicle side crash, so that the side sill can be properly restrained from coming toward the vehicle inside. Further, since the reinforcing member supports the upper-end side portion of the side sill, the rotation of the side sill toward the vehicle inside can be restrained, so that the vehicle constituting members can be properly restrained from coming toward the vehicle inside. Further, since the reinforcing member is provided on the front portion of the kick-up portion at the specified position which overlaps with the rear side frame in the plan view, so that it can be arranged at almost the same area as the rear side frame in the elevation view. Accordingly, the side sill can be surely restrained from coming and rotating toward the vehicle inside, without any increased layout space.

According to another embodiment of the present invention, both-side ends of the front floor panel in front of the kick-up portion are connected to inside-lower portions of the side sills. Thereby, the rotation of the side sill around the lower portion of the side sill can be effectively restrained even in case the both-side ends of the front floor panel in front of the kick-up portion are connected to the inside-lower portions of the side sills, so that the vehicle constituting members, such as the rotating pillar or door, can be properly restrained from coming toward the vehicle inside.

According to another embodiment of the present invention, a cross member which connects the pair of side sills is provided on a front face of the kick-up portion, and the reinforcing member is provided in a closed cross section which is formed by the cross member and the rear floor panel. Thereby, the support strength of the reinforcing member can be increased, and the move and rotation of the side sill toward the vehicle inside can be restrained by cooperation of the reinforcing member and the cross member. Further, a proper layout of the reinforcing member can be achieved by utilizing the closed cross section.

According to another aspect of the present invention, there is provided a lower vehicle-body structure of a vehicle, comprising a side sill, a center pillar connected to the side sill at a lower end thereof, and a side-sill reinforcement provided inside the side sill, the side-sill reinforcement having a U-shaped cross section opening toward a vehicle inside, wherein a lower portion of the side-sill reinforcement has a flexural structure to allow the side sill to bend when a load of a vehicle side crash is inputted, and an upper portion of the side-sill reinforcement which corresponds to a connection portion to the center pillar has a load absorbing portion to deform and absorb the load of the vehicle side crash.

According to this aspect of the present invention, since the flexural structure is provided at the lower portion of the side-sill reinforcement, the side sill can be properly made bend flexibly without breaking against the load of the vehicle side crash inputted via the center pillar, thereby restraining the side sill from coming toward the vehicle inside. Further, since the load absorbing portion is provided at the upper portion of the side-sill reinforcement at the specified position corresponding to the connection portion, the crash load can be properly absorbed. Moreover, the proper deformation of the lower portion of the center pillar toward the vehicle inside can be ensured by the above-described flexible bending of the side sill, so that the upper portion of the center pillar can be properly restrained from coming toward the vehicle inside.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
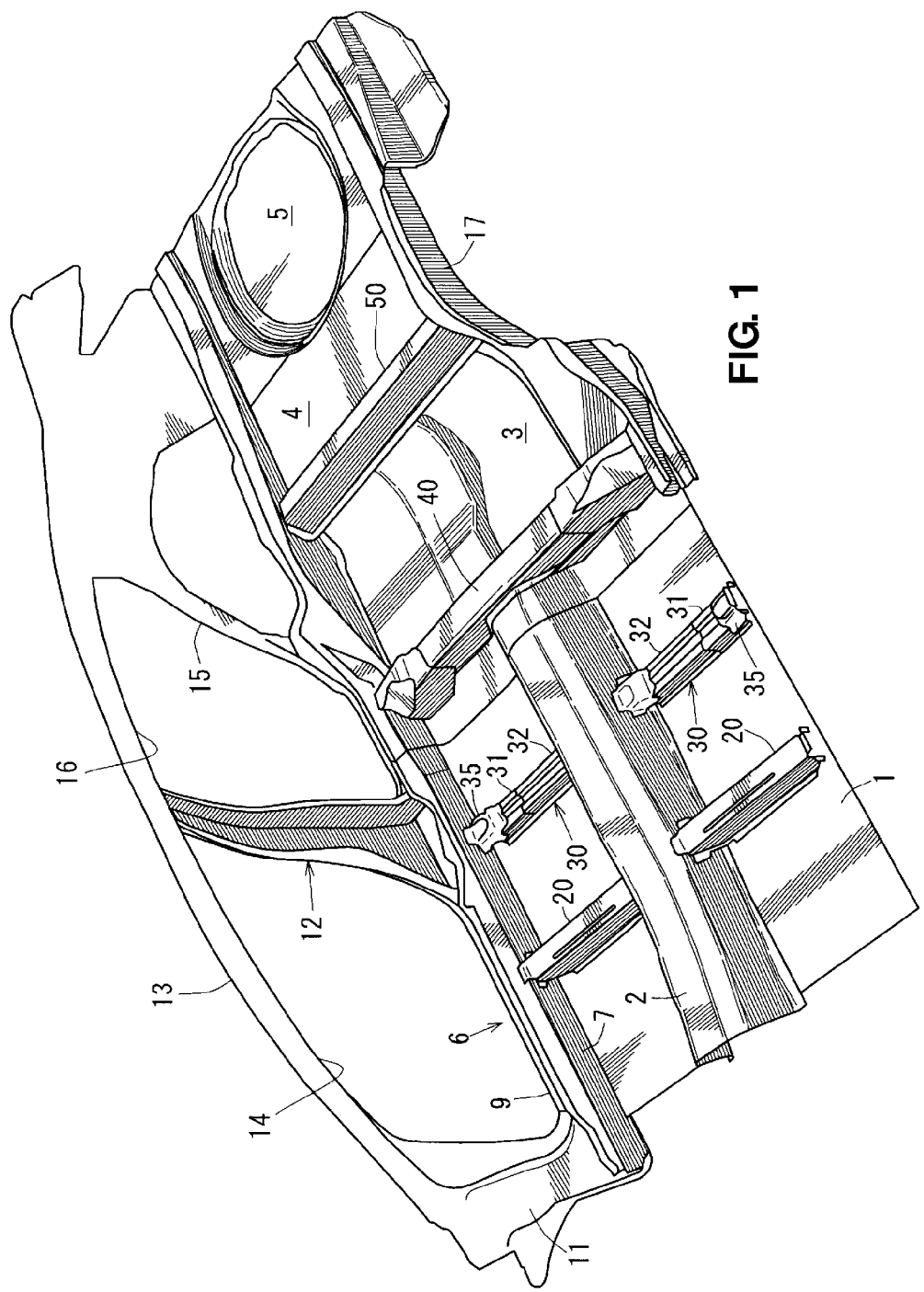
FIG. 1 is a schematic perspective view showing a lower vehicle-body structure of a vehicle according to a first embodiment of the present invention.

In FIG. 1, a floor panel (front floor panel) 1 which forms a bottom face of a vehicle compartment is provided, and a tunnel portion 2 (a so-called floor tunnel) which projects upward and extends in a vehicle longitudinal direction is integrally formed at the center of the floor panel 1 in a vehicle width direction. This tunnel portion 2 constitutes the vehicle-body rigidity mainly.

A rear seat pan 3 is provided at a rear portion of the floor panel 1. A rear floor (panel) 4 which forms a bottom face of a baggage compartment is provided continuously in back of the rear seat pan 3. A concave spare pan 5 is integrally formed at the center of a rear portion of the rear floor 4.

Figure 2:
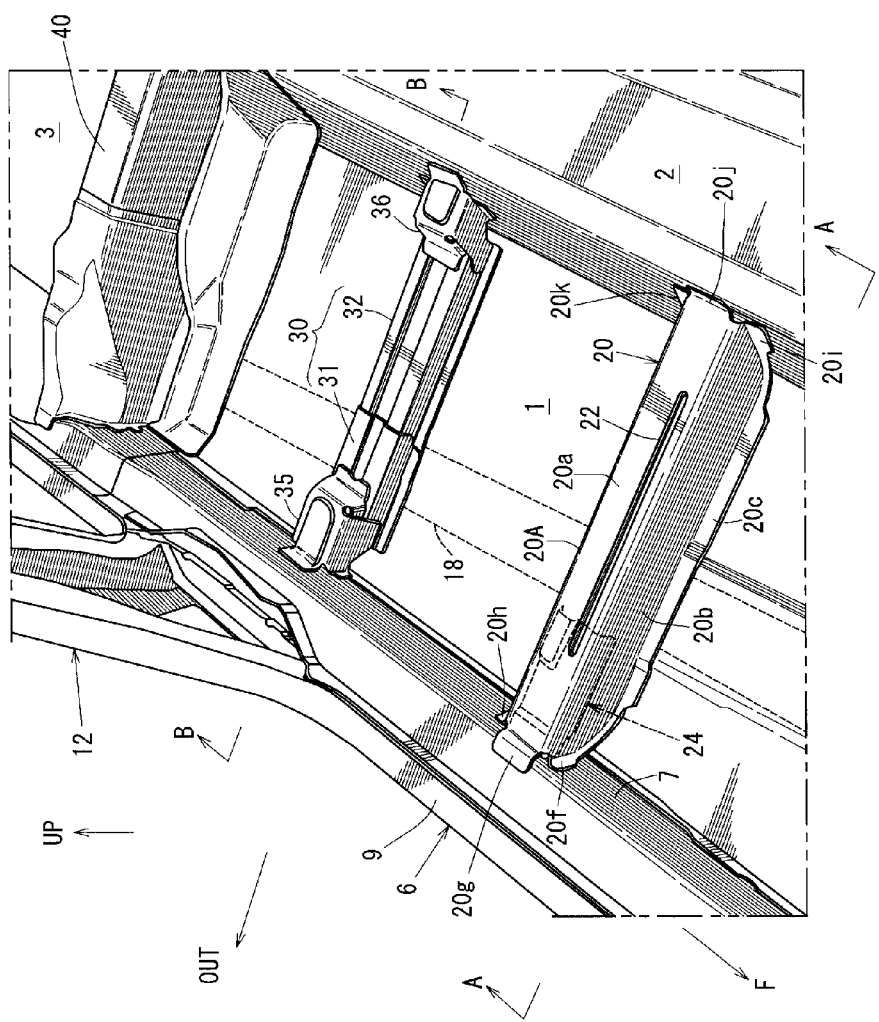
FIG. 2 is a perspective view showing the lower vehicle-body structure of a vehicle.
Figure 3:
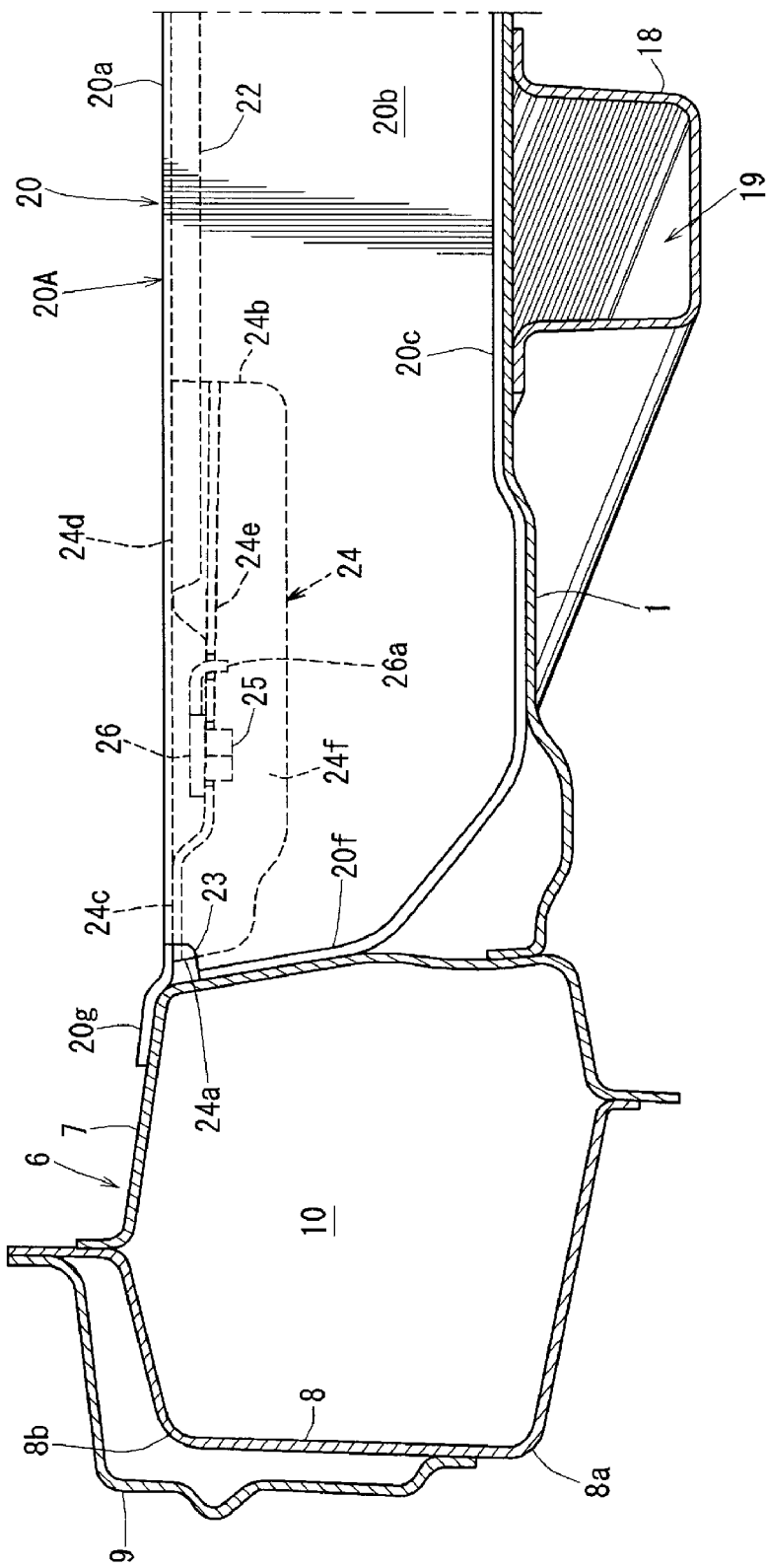
FIG. 3 is a sectional view taken along line A-A of FIG. 2.

Further, a pair of side sills 6, as vehicle-body rigidity member, which extends in the vehicle longitudinal direction, is provided at both sides of the floor panel 1 (only the side sill on the right is illustrated in the figure). The side sill 6 is a strength member which is made of a side-sill inner 7, a side-sill reinforcement 8, and a side-sill outer 9, which are connected together to form a side-sill closed cross section 10 which extends in the vehicle longitudinal direction, as shown in FIGS. 2 and 3.

A hinge pillar 11 extends upward from a front portion of the side sill 6, and a center pillar 12 extends upward from a middle portion of the side sill 6 in the vehicle longitudinal direction. These pillars 11, 12 are vehicle-body strength members to rotatably support a front door and a rear door, not illustrated, respectively. The hinge pillar 11 is a vehicle-body rigidity member which comprises a hinge-pillar outer and a hinge-pillar inner and forms a hinge-pillar closed cross section which extends vertically. The hinge pillar 11 is provided between a roof side rail 13 and the side sill 6, and a hinge-pillar reinforcement may be provided between the hinge-pillar inner and the hinge-pillar outer at need.

Further, the center pillar 12 is a vehicle-body rigidity member which comprises a center-pillar outer, a center-pillar reinforcement, and a center-pillar inner and forms a center-pillar closed cross section which extends vertically. The center pillar 12 is provided between the roof side rail 13 and the side sill 6. Herein, a space enclosed by the hinge pillar 11, the side sill 6, the center pillar 12, and the roof side rail 13 forms an ingress-egress opening 14 (door opening) for a front-seat passenger. A space enclosed by the center pillar 12, the side sill 6, a quarter pillar 15, and the roof side rail 13 forms an ingress-egress opening 16 (door opening) for a rear-seat passenger. A pair of rear side frames 17 is provided at both sides of the rear seat pan 3 and the rear floor 4 so as to extend continuously from the pair of side sills 6.

Meanwhile, a pair of cross member 20 (a so-called No. 2 cross member) which extends in the vehicle width direction is provided on the floor panel 1 between the tunnel portion 2 and the side sill 6 at a specified position which corresponds to the ingress-egress opening 14 for front-seat passengers. Further, a pair of cross member 30 (a so-called No. 2.5 cross member) which extends in the vehicle width direction is provided on the floor panel 1 between the tunnel portion 2 and the side sill 6 at another specified position which corresponds to the center pillar 12. Moreover, a rear cross member 40 (a so-called No. 3 cross member) which extends in the vehicle width direction is provided at a portion between a rear portion of the floor panel 1 and a front portion of the rear seat pan 3, and another rear cross member 50 (a so-called No. 4 cross member) which extends in the vehicle width direction is provided at a portion between a rear portion of the rear seat pan 3 and a front portion of the rear floor 4. These cross members 20, 30 and rear cross members 40, 50 are a vehicle-body rigidity member, respectively, which increase the rigidity of the vehicle-body lower portion.

Meanwhile, as shown in FIGS. 2 and 3, a floor flame 18 is connected to a lower portion of the floor panel 1 so as to form a closed cross section 19 which extends in the vehicle longitudinal direction with the floor panel 1. In the present embodiment, a front portion of the floor frame 18 is positioned at the center between the side-sill inner 7 and the tunnel portion 2, and a rear portion of the floor frame 18 is positioned outwardly, so the floor frame 18 is configured to extend obliquely in a plan view.

Figure 4:
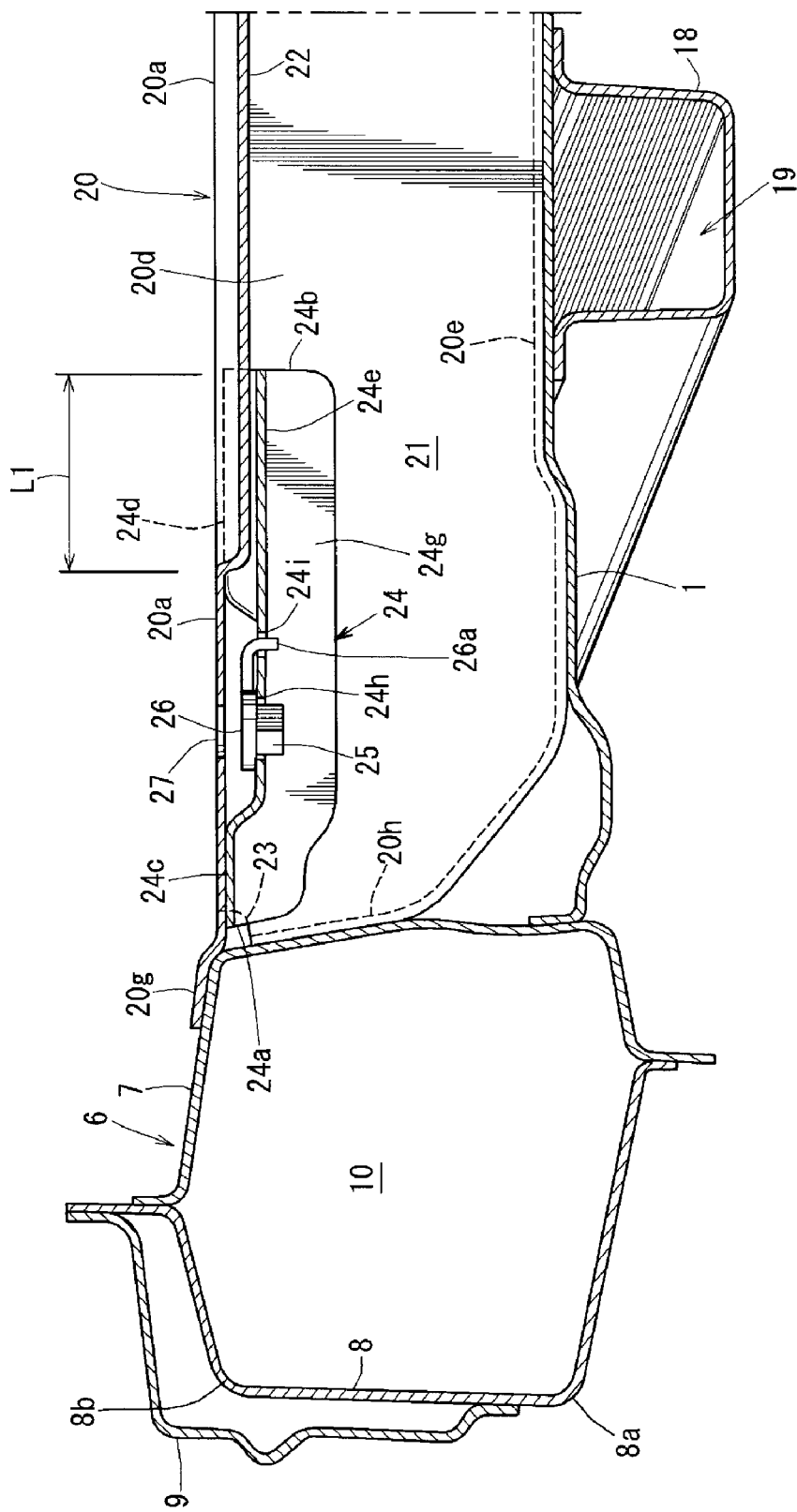
FIG. 4 is a sectional view showing a relative structure of a cross member and a nut plate.

The above-described cross member 20 comprises, as shown in FIGS. 2-5, a body portion 20A which is formed by an upper piece 20a, a front piece 20b, a connecting flange piece 20c which bends forward from a lower end of the front piece 20b, a rear piece 20d (see FIG. 4), and a connecting flange piece 20e which bends rearward from a lower end of the rear piece 20d. The body portion 20A further includes connecting flange pieces 20f, 20g, 20h for connecting to the side-sill inner 7 at its outside end portion, and connecting flange pieces 20i, 20j, 20k for connecting to the tunnel portion 2 at its inside end portion. The cross member 20 is integrally formed with the above-described pieces 20a-20k, and its body portion has a U-shaped cross section. The lower connecting flanges 20a, 20e are connected to the upper face of the floor panel 1, so that a closed cross section 21 (see FIG. 4) which extends in the vehicle width direction is formed between the floor panel 1 and the cross member 20. Further, a bead 22 as a reinforcing member to prevent buckling of the cross member 20 is formed at an inside area of the upper face of the body portion 20A of the cross member 20. This bead 22 is the reinforcing member which is concaved downward from the upper piece 20a and extends in the vehicle width direction as shown in FIGS. 2 and 4. Herein, this bead may be formed in a convex shape instead.

Figure 5:
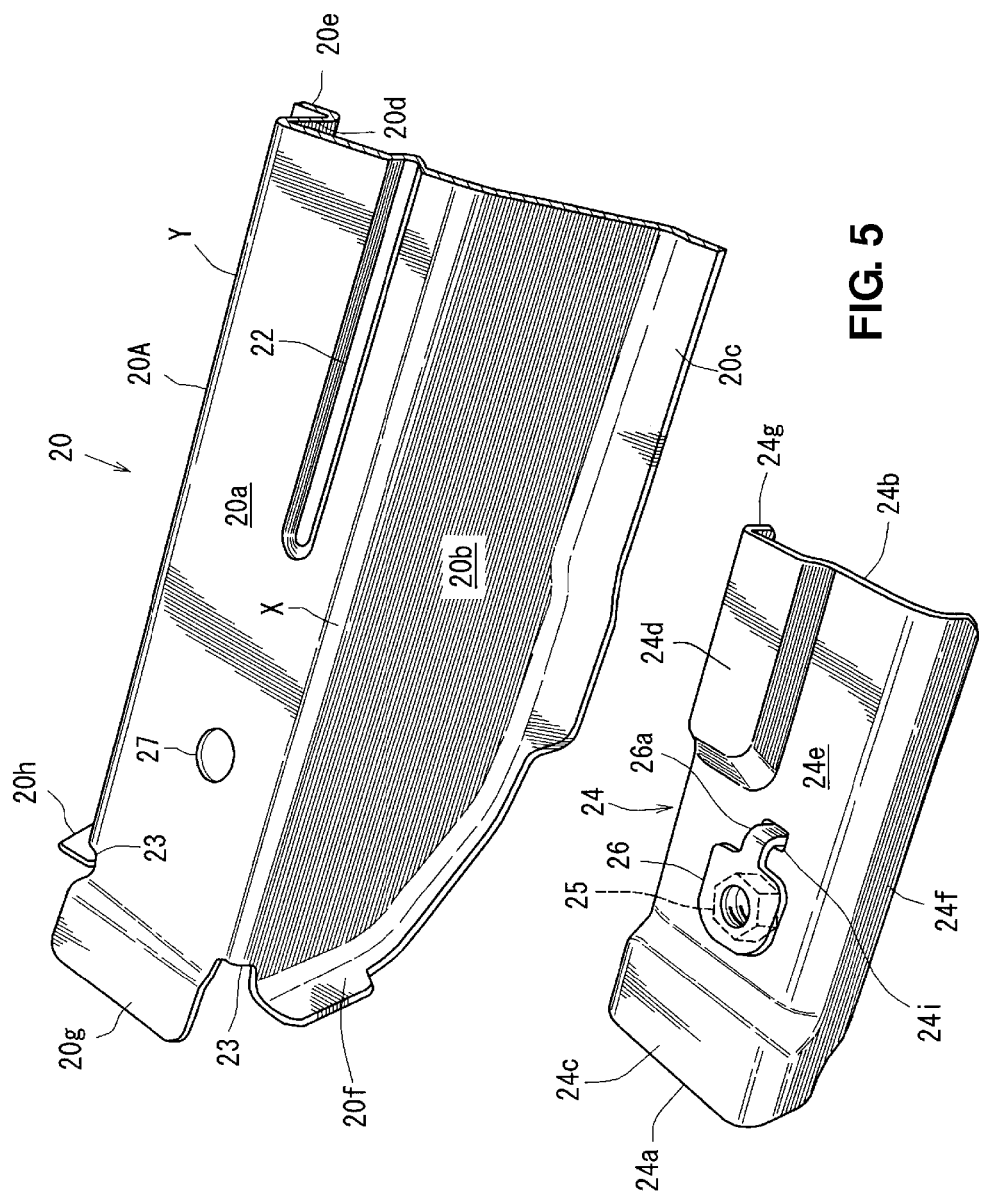
FIG. 5 is an exploded perspective view of the cross member and the nut plate.
Figure 6:
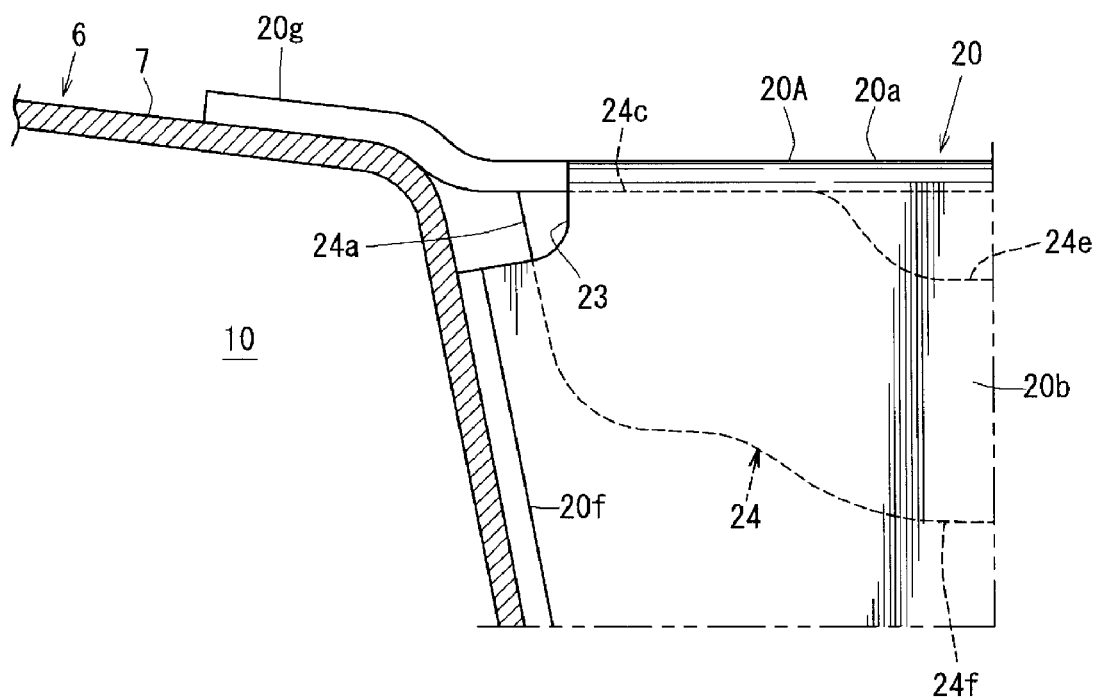
FIG. 6 is an enlarged view of a major portion of FIG. 3.

Further, as shown in FIGS. 3, 4 and 6, notches 23 are formed near outside connection ends of the cross member 20 to the side sill 6 as an impact absorbing portion to absorb the impact of the vehicle side crash. This notch 23 is a weak portion which is formed in such a manner that each outside corner end of the cross member 20 is cut away as shown in FIGS. 5 and 6. More specifically, respective outside end portions of a front-side ridgeline X between the upper piece 20a and the front piece 20b of the cross member 20 and a rear-side ridgeline Y between the upper piece 20a and the rear piece 20d are cut away. Thus, since the notches 23 are formed at the ends of the ridgelines X, Y having a high strength, the proper impact absorbing portion can be provided.

Moreover, as shown in FIGS. 3 and 4, a nut plate 24 is arranged near the outside end of the body portion 20A of the cross member 20 as a reinforcing member. This nut plate 24 is provided so that its outside end portion 24a overlaps with the notch 23 as shown in FIGS. 3 and 6. Herein, the outside end portion 24a of the nut plate 24 as the reinforcing member is positioned away from the side-sill inner 7 as shown in the enlarged view of FIG. 6. The nut plate 24 comprises, as shown in the perspective view of FIG. 5, connection portions 24c, 24d which are connected to the lower face of the upper piece 20a of the cross member 20 by spot welding, a substantially-flat upper piece 24e which is concaved relative to the connection portions 24c, 24d, a front piece 24f, and a rear piece 24g which are formed integrally therewith. The front piece 24f of the nut plate 24 is connected to the front piece 20b of the cross member 20 in the closed cross section 21, the rear piece 24g of the nut plate 24 is connected to the rear piece 20d of the cross member 20 in the closed cross section 21. The upper piece 24e of the nut plate 24 has openings 24h, 24i as shown in FIGS. 4 and 5. A nut support member 26 which has a nut 25 welded to its lower face is provided, which has an engaging piece 26a which is of a reverse-L shape.

Herein, the above-described nut 25 is arranged into the opening 24h of the nut plate 24, and the engaging piece 26a is inserted into the opening 24i of the nut plate 24. Thereby, the position of the nut support member 26 can be slightly adjusted longitudinally and laterally in a state in which it is equipped with the nut 25, which can provide a proper seat attachment. The nut plate 24 is a seat-attaching member to fix a passenger's seat (front seat), not illustrated, to the cross member 20. Further, this nut plate 24 is also a plate to hold the nut for fixing the passenger's seat 25 inside the closed cross section 21 (see FIG. 4) between the cross member 20 and the floor panel 1. A bolt through hole 27 is formed at the upper piece 20a of the cross member 20 which vertically faces to the nut 25 of the nut plate 24. The strength of the nut plate 24 as the reinforcing member and the seat-attaching member is set to be weaker than that of the body portion 20A of the cross member 20.

Herein, while the cross member 20 is made of a high-tension steel sheet and the strength of the nut plate 24 is set to be weaker than that of the cross member 20 by making the nut plate 24 of a normal steel sheet in the present embodiment, another structure in which the thickness of the cross member 20 is set to be thicker than that of the nut plate 24 and the both members 20, 24 are made from the same material may be applied instead.

Further, as shown in FIG. 4, the nut plate 24 is arranged so that its inside end portion 24b overlaps with the bead 22 of the cross member 20 by a distance L1 in the vehicle width direction. This overlap structure restrain the buckling of the body portion 20A of the cross member 20.

Figure 7:
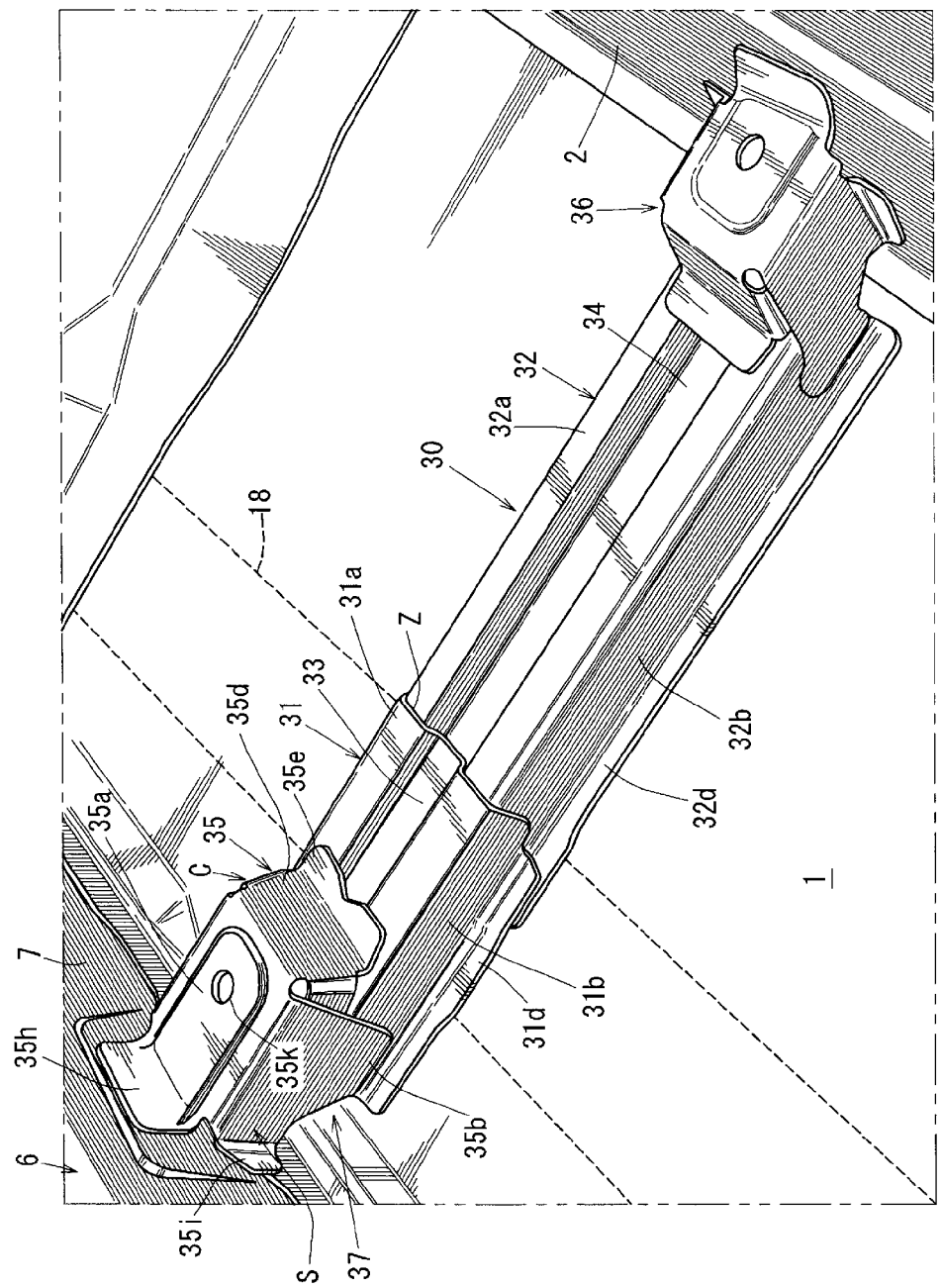
FIG. 7 is an enlarged perspective view of a major portion of FIG. 2.

FIG. 7 is an enlarged perspective view of a major portion of FIG. 2, which shows a cross member 30 (so-called No. 2.5 cross member) which extends in the vehicle width direction on the floor panel 1 between the tunnel portion 2 and the side sill 6 which is connected to the center pillar 12 and its surrounding structure. The cross member 30 comprises a first cross member 31 as its outside portion, and a second cross member 32 as its inside portion. In the present embodiment, the first cross member 31 is configured to have a higher strength compared to the second cross member 32. This configuration may be provided by setting the thickness of the first cross member 31 to be thicker than that of the second cross member 32, or by making the first cross member 31 of the high-tension steel sheet and making the second cross member 32 of the normal steel sheet.

Figure 8:
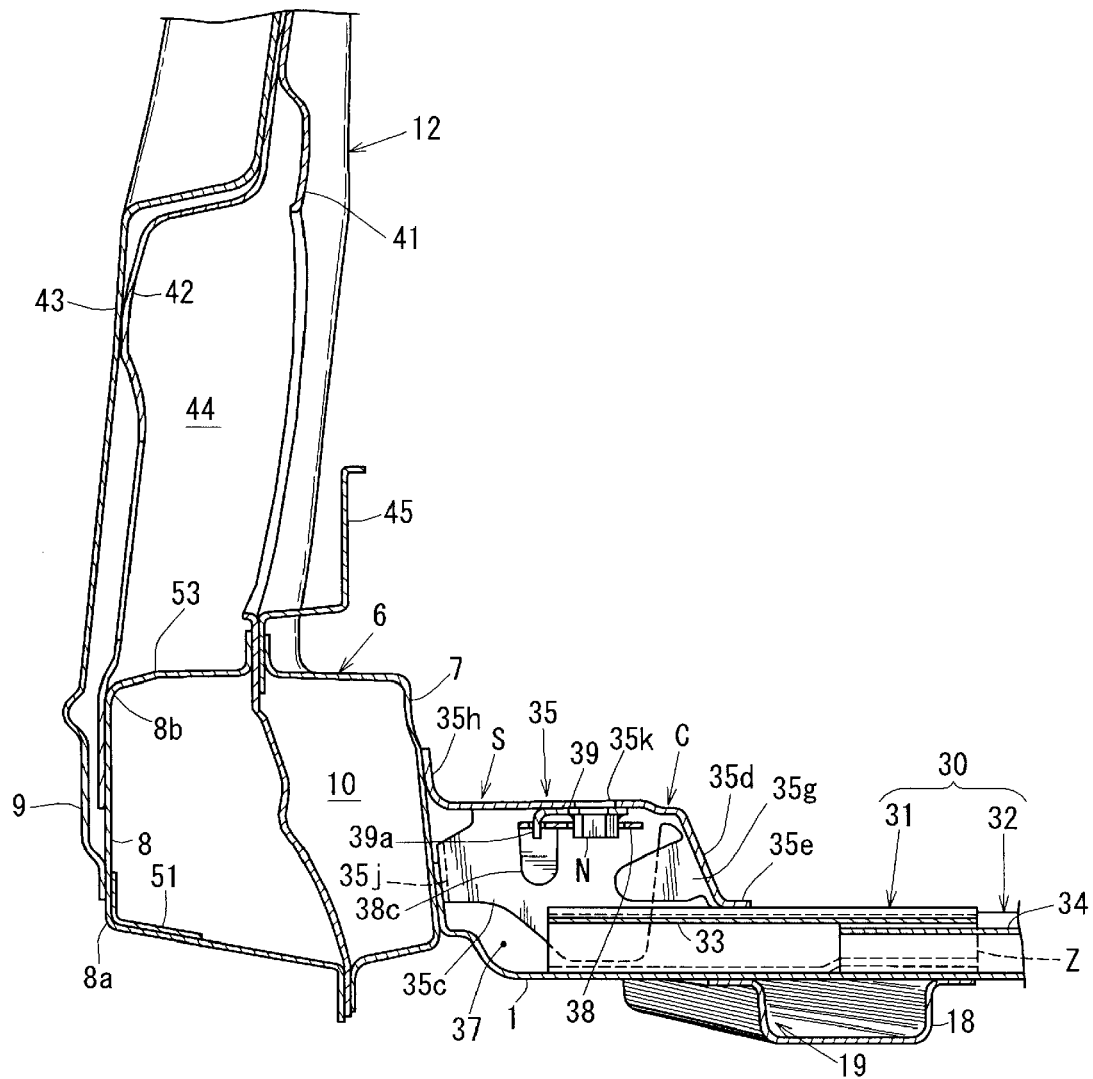
FIG. 8 is a sectional view taken along line B-B of FIG. 2.
Figure 9:
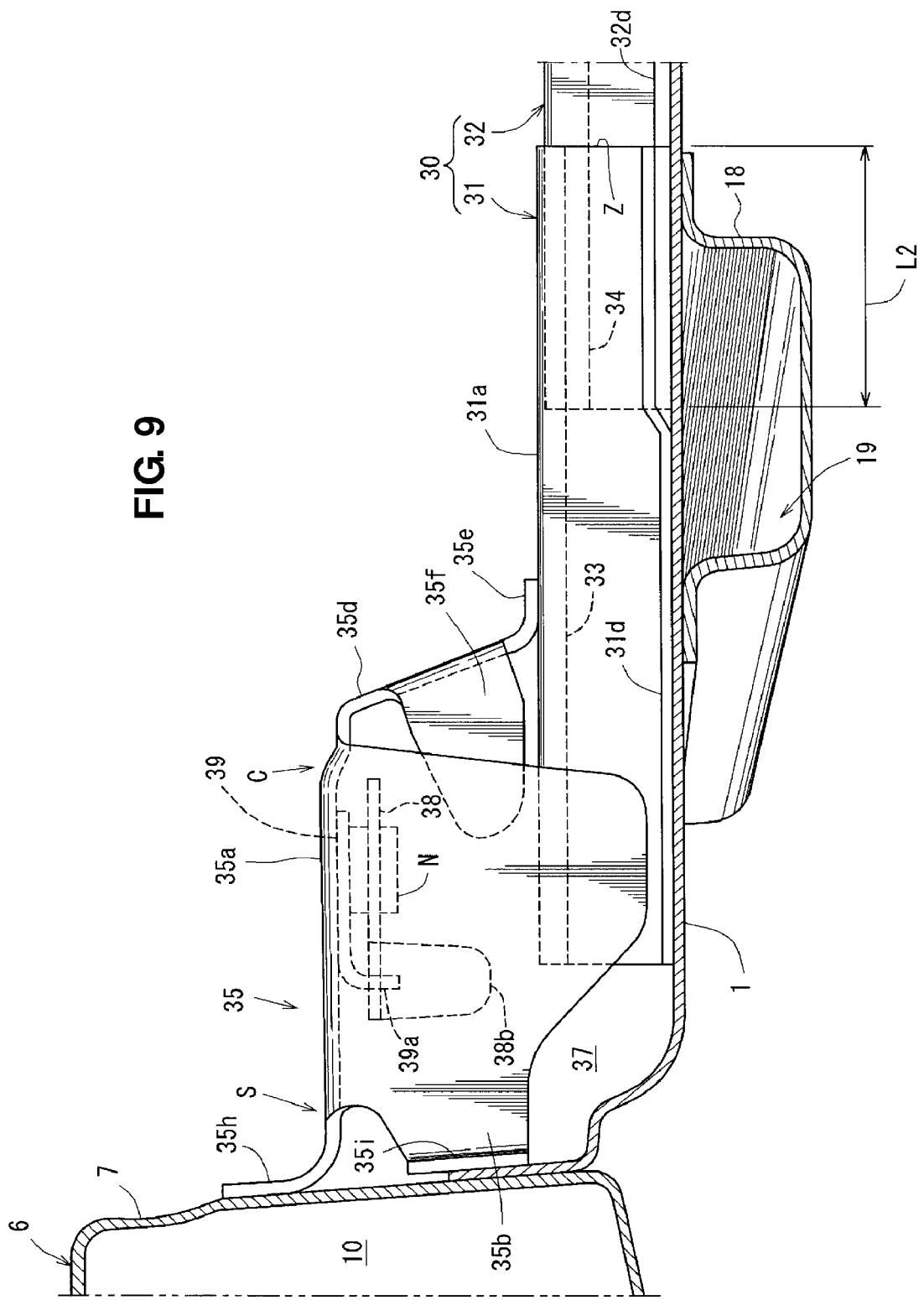
FIG. 9 is an enlarged elevation view of a major portion of FIG. 7.

Further, in the present embodiment, as shown in FIG. 7, the first cross member 31 and the second cross member 32 are made separately, and the first cross member 31 is connected onto the second cross member 32. A border Z between the first cross member 31 and the second cross member 32 is positioned at a location which is right above the floor frame 18 as the above-described frame member, or offset toward the tunnel portion 2, as shown in FIGS. 7, 8 and 9. As shown in FIG. 9 showing the enlarged view of FIG. 8, the first and second cross members 31, 32 are connected with a distance overlap of L2 on the outside of the border Z. This overlap area is positioned above the floor frame 18.

Figure 10:
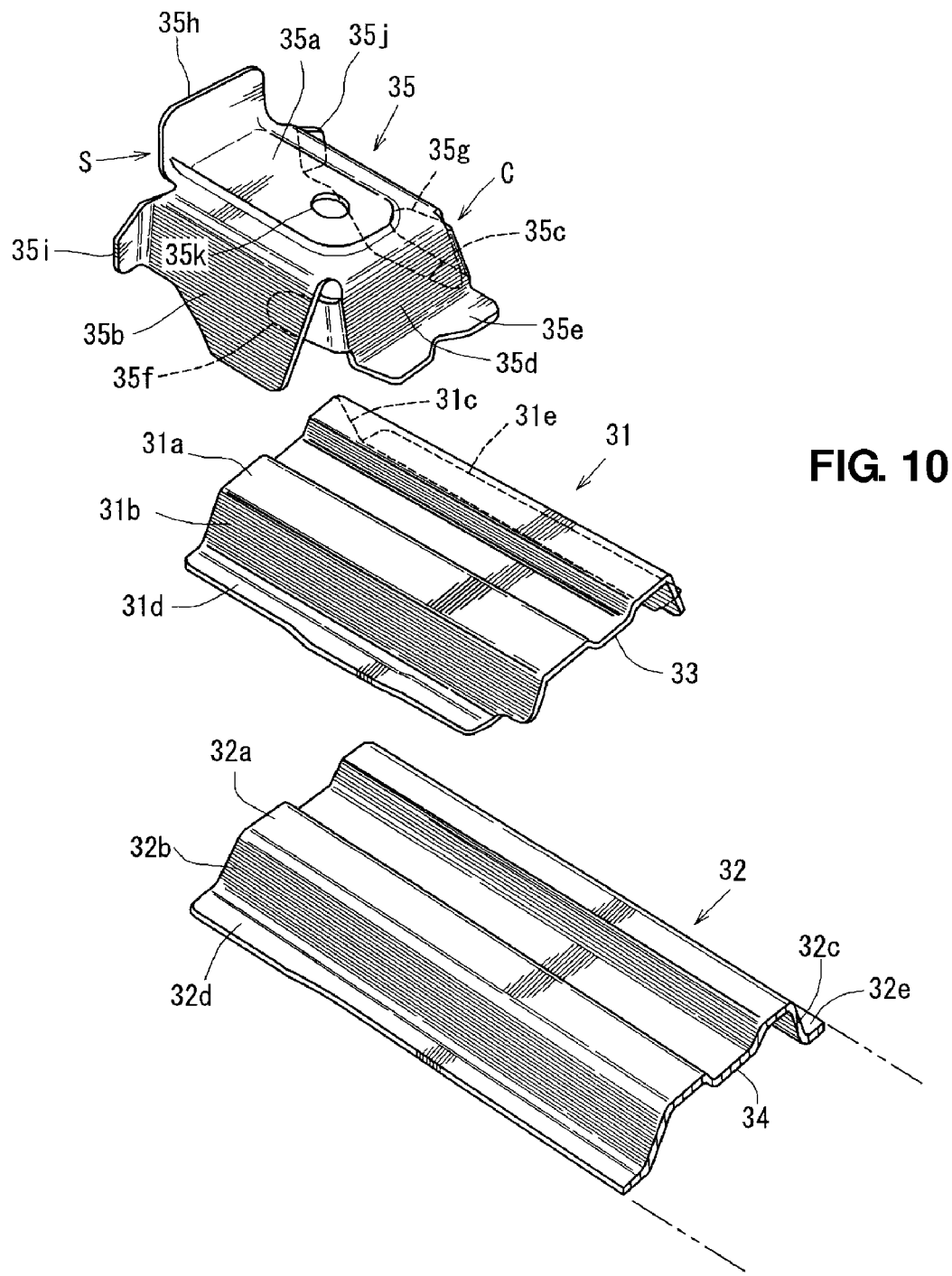
FIG. 10 is an exploded perspective view of a connecting member, an outside portion of the cross member, and an inside portion of the cross member.

As shown in FIG. 10 which is an exploded perspective view of the first and second cross members 31, 32, the first cross member 31 is a vehicle-body rigidity member which comprises an upper piece 31a, a front piece 31b, a rear piece 31c, and connecting flanges 31d, 31e which bend longitudinally from the pieces 31b, 31c, where are formed integrally. A bead 33 as a reinforcing member is formed at the center of the upper piece 31a so as to be concaved downward from the upper piece 31a and extend over its whole longitudinal length. Likewise, the second cross member 32 is another vehicle-body rigidity member which comprises an upper piece 32a, a front piece 32b, a rear piece 32c, and connecting flanges 32d, 32e which bend longitudinally from the pieces 32b, 32c, where are formed integrally. A bead 34 as a reinforcing member is formed at the center of the upper piece 32a so as to be concaved downward from the upper piece 32a and extend over its whole longitudinal length.

The above-described flanges 31d, 31e, 32d, 32e are connected to the upper face of the floor panel 1 by spot welding, so that the closed cross section is formed between the floor panel 1 and the first cross member 31 and between the floor panel 1 and the second cross member 32 so as to extend continuously in the vehicle width direction. Further, as shown in FIG. 7, the outside end of the cross member 30 which is comprised of the first and second cross members 31, 32 on the side of the side sill 6 is positioned away from the side-sill inner 7 by a specified distance. Likewise, the other end of the cross member 30 on the side of the tunnel portion 2 is positioned away from the tunnel portion 2 by a specified distance. A connecting member 35 which connects the side-sill-side end of the first cross member 31 to the side-sill inner 7 of the side sill 6 is provided, and a connecting member 36 which connects the tunnel-portion-side end of the second cross member 32 to the tunnel portion 2 is provided. These connecting members 35, 36 also constitute seat-attaching brackets to support the front seat for passenger (not illustrated).

As shown in FIG. 10, an exploded perspective view of the above-described connecting member 35, the connecting member 35 comprises an upper piece 35a, a front piece 35b which bends downward from the front end of the upper piece 35a, a rear piece 35c which bends downward from the rear end of the upper piece 35a, an inner piece 35d which bends downward from the inner end of the upper piece 35a, a connecting flange 35e which bends horizontally from the lower end of the inner piece 35d, connecting flanges 35f, 35g which bend outwardly from the front end and the rear end of the inner piece 35d, and connecting flanges 35h, 35i, 35j which bend from the respective outside ends of the upper piece 35a, the front piece 35b and the rear piece 35c, which are formed integrally. The connecting flange 35f is connected to the inner face of the front piece 35b by spot welding in advance, and the connecting flange 35g is connected to the inner face of the rear piece 35c by spot welding in advance.

As shown in FIG. 7, the connecting flange 35e of the connecting member 35 is connected to the upper piece 31a of the first cross member 31, the front and rear pieces 35b, 35c of the connecting member 35 are connected to the front and rear pieces 31b, 31c of the first cross member 31, respectively, and the connecting flanges 35h, 35i, 35j of the connecting member 35 are connected to the side-sill inner 7 directly or indirectly via turning-up portions of the floor panel 1. The connecting member 35 has a lower strength compared to the cross member 30, and the strength of a connection area C of the connecting member 35 to the cross member is set to be higher than that of another connection area S of the connecting member 35 to the side sill. Further, the connection area C is formed in a box shape enclosed by the upper piece 35a, the front piece 35b, the rear piece 35c and the inner piece 35d. The connection area S is formed in an open shape enclosed by the upper piece 35a, the front piece 35b and the rear piece 35c. Thus, the strength of the connection area C is configured to be higher than that of the connection area S. Further, as shown in FIG. 9, between the lower end of the connection area S of the connecting member 35 and the upper portion of the floor panel 1 is formed a space 37 which allows a compressive deformation of the connection area S when the load of the vehicle side crash is inputted.

Figure 11:
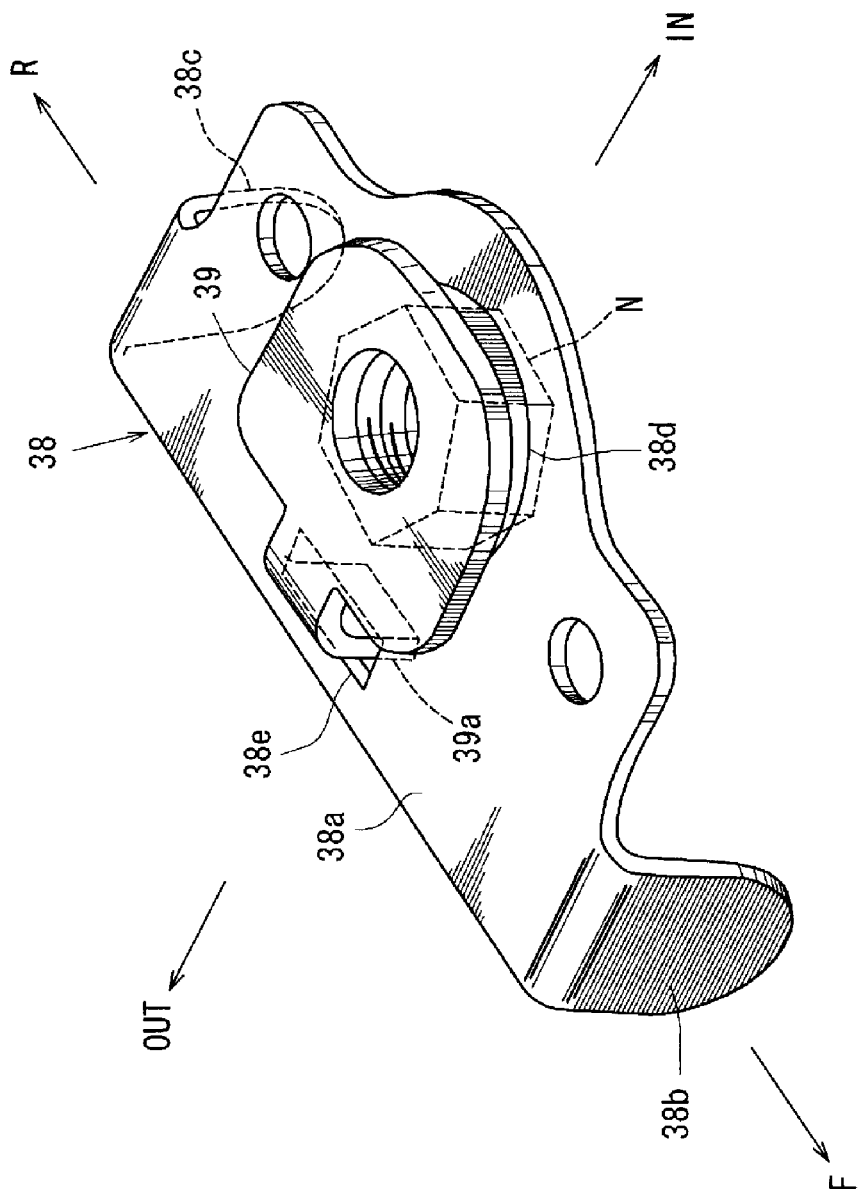
FIG. 11 is a perspective view of the nut plate.

In addition, as shown in FIGS. 8 and 9, a nut plate 38 is attached to the inside of the connecting member 35 which is comprised of the seat-attaching bracket. This nut plate 38 comprises, as shown in a perspective view of FIG. 11, a substantially-flat upper piece 38a, front and rear attaching pieces 38b, 38c which bend downward from front and rear ends of the upper piece 38a, and two openings 38d, 38e which are formed at the upper piece 38a. A nut support member 39 which has a nut N welded to its lower face is provided, which has an engaging piece 39a which bends downward. The nut N of the nut support member 39 is put into the opening 38d of the nut plate 38, and the engaging piece 39a is inserted into the other opening 38e. Thereby, the position of the nut support member 39 can be slightly adjusted longitudinally and laterally in a state in which it is equipped with the nut N, which can provide a proper seat attachment. Herein, the front and rear attaching pieces 38b, 38c of the nut plate 38 are welded to the front and rear pieces 35b, 35c of the connecting member 35. Meanwhile, a bolt through-hole 35k, thorough which a bolt for attaching seat (not illustrated) is inserted, is formed at the upper piece 35a of the connecting member 35.

The connection member 36 which connects the second cross member 32 and the tunnel portion 2 has a substantially symmetrical structure to the connection member 35 as shown in FIG. 7.

Meanwhile, as show in FIG. 8, the above-described center pillar 12 is a vehicle-body rigidity member which comprises a center-pillar inner 41, a center-pillar reinforcement 42, and a center-pillar outer 43 which are joined together to form a center-pillar closed cross section 44 which extends vertically. A lower portion of the center-pillar inner 41 extends through the side-sill closed cross section 10 between the side-sill inner 7 and the side-sill reinforcement 8 of the side sill 6 to a lower connection portion of these members 7, 8. A lower portion of the center pillar outer 43 is formed integrally with the side-sill outer 9. Further, a retractor support bracket 45 which supports a retractor (not illustrated) is attached to an upper connection portion of the side-sill inner 7 and the side-sill reinforcement 8. As shown in FIG. 8, the lower end of the center pillar 12 is connected to the side sill 6, and the side-sill reinforcement 8 which has a U-shaped cross section opening toward the vehicle inside is provided inside the side sill 6.

Figure 12:
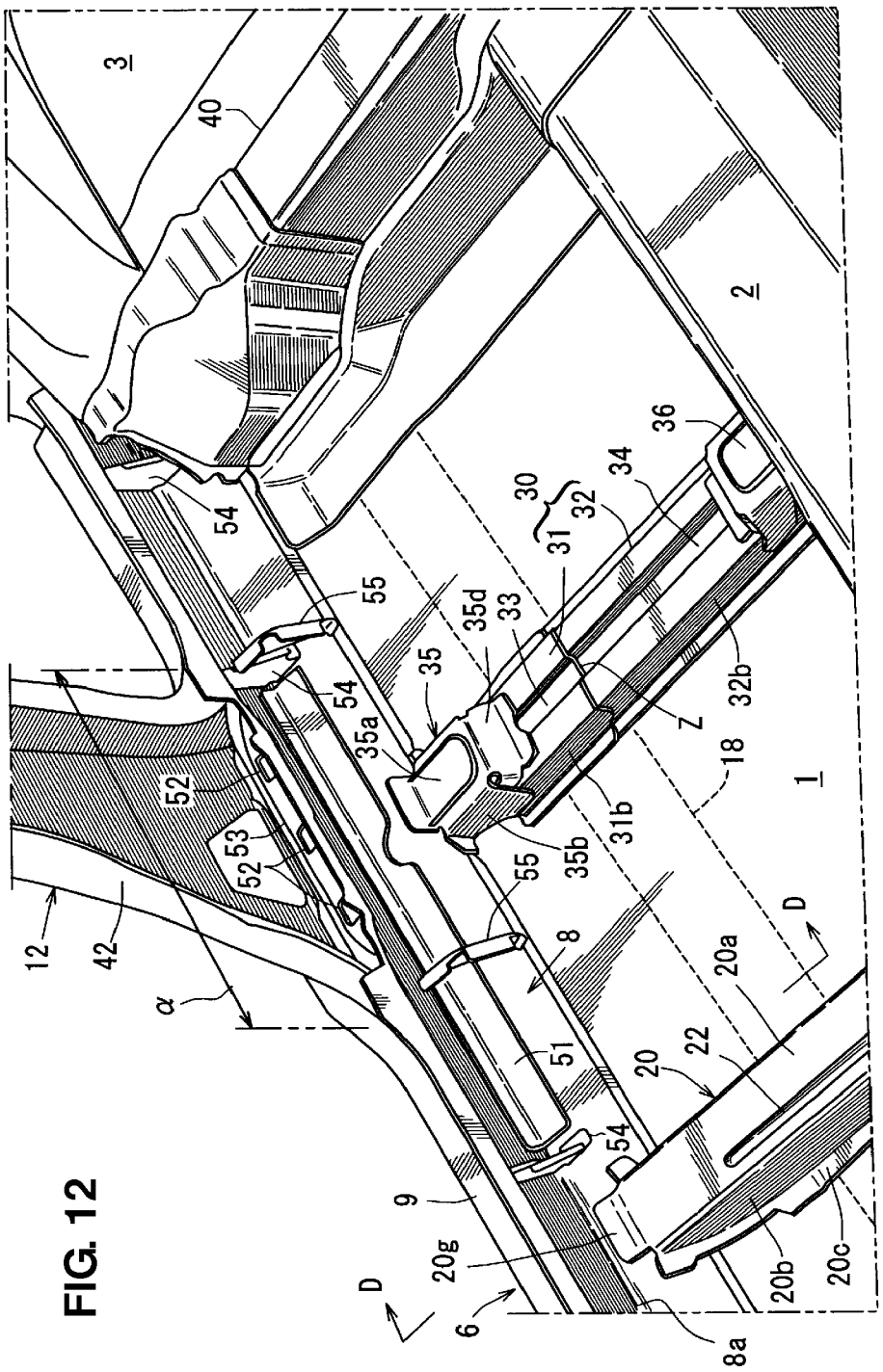
FIG. 12 is a perspective view showing a disposition structure of a reinforcing member and gussets.
Figure 13:
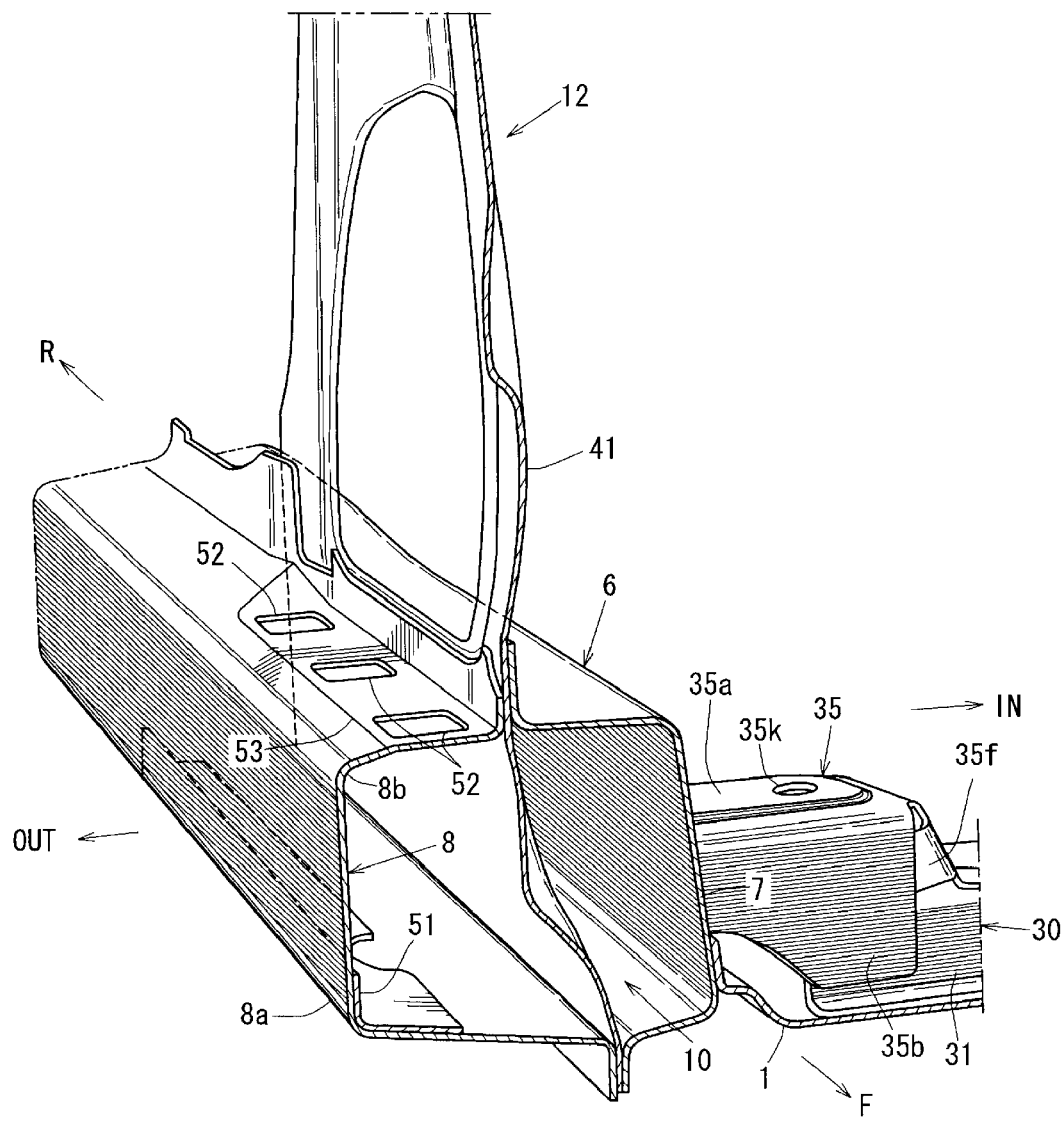
FIG. 13 is a perspective view showing a structure of a deformation promoting portion.

FIG. 12 is a perspective view showing the inside structure of the side sill 6, omitting illustrations of the side-sill inner 7, the center-pillar inner 41 and others. FIG. 13 is a perspective view of a structure of a connection portion between the side sill 6 and the lower portion of the center pillar 12. As shown in FIGS. 12 and 13, a reinforcing member 51 which has an L-shaped cross section is provided at a lower-outside corner 8a of the side-sill reinforcement 8 for restraining deformation of this corner 8a. This reinforcing member 51 is fixed to the inside of the corner 8a of the side-sill reinforcement 8 by spot welding, and extends in the vehicle longitudinal direction, including a connection portion α of the side sill 6 to the center pillar (see FIG. 12) as shown in FIGS. 12 and 13. The reinforcing member 51 restrains the side sill 6 from breaking against the vehicle-side crash load inputted via the center pillar 12 and allows the flexible bending of the side sill 6.

Moreover, as shown in FIG. 13, plural openings 52, 52 and a bending portion 53 are provided at an upper portion of the side-sill reinforcement 8 at a specified position which corresponds to the above-described connection portion α as a deformation promoting portion which can promote deformation of the upper portion, particularly an upper corner 8b of the side-sill reinforcement 8. The deformation promoting portion (openings 52, bending portion 53) can make the upper face of the side-sill reinforcement 8 deform properly when the vehicle-side crash load is inputted, so that the crash impact can be absorbed properly. Further, a proper deformation of the lower portion of the center pillar 12 toward the vehicle inside can be ensured, so that the upper portion of the center pillar 12 can be properly restrained from coming toward the vehicle inside. The above-described deformation promoting portion (openings 52, bending portion 53) is, as shown in FIGS. 12 and 13, provided within the range of the above-described connection portion α of the side-sill reinforcement 8 to the center pillar, and the above-described reinforcing member 51 is provided over a specified range which is longer than the above-described range of the connection portion α in the vehicle longitudinal direction.

Herein, the above-described plural openings 52, 52 constitutes a weak portion (deformation promoting portion) which is provided at the upper face of the side-sill reinforcement 8 in the present embodiment, but a single opening may be applied instead of the plural openings and furthermore, plural slits may be used in place of the openings 52. Moreover, the above-described bending portion 53 also constitutes the deformation promoting portion which is provided at the upper face of the side-sill reinforcement 8, specifically, at the specified portion near the upper corner 8b and causes the buckling of the upper face of the side-sill reinforcement 8. This bending portion 53 is positioned on the vehicle outside relative to the openings 52 so as to be formed between the bending portion 53 and the upper corner 52 in the present embodiment. In other words, in the present embodiment, the openings 52 and the bending portion 53, which are different kinds of deformation promoting portion, are provided side by side within the range of the connection portion α of the side-sill reinforcement 8 to the center pillar so that the deformation of the upper face (upper corner 8b) of the side-sill reinforcement 8 can be promoted when the vehicle-side crash load is inputted, thereby absorbing the crash impact properly.

Further, as shown in FIG. 12, outer gussets 54, 54 are provided at front and rear positions of the above-described reinforcing member 51 as a gusset to form a node in the cross section of the side-sill reinforcement 8. Herein, a front end of the reinforcing member 51 is positioned between the cross members 20, 30, and a rear end of the reinforcing member 51 is positioned between the cross members 20, 30, so the outer gussets 54, 54 are positioned between the members 20, 30 and between the members 30, 40.

Figure 14:
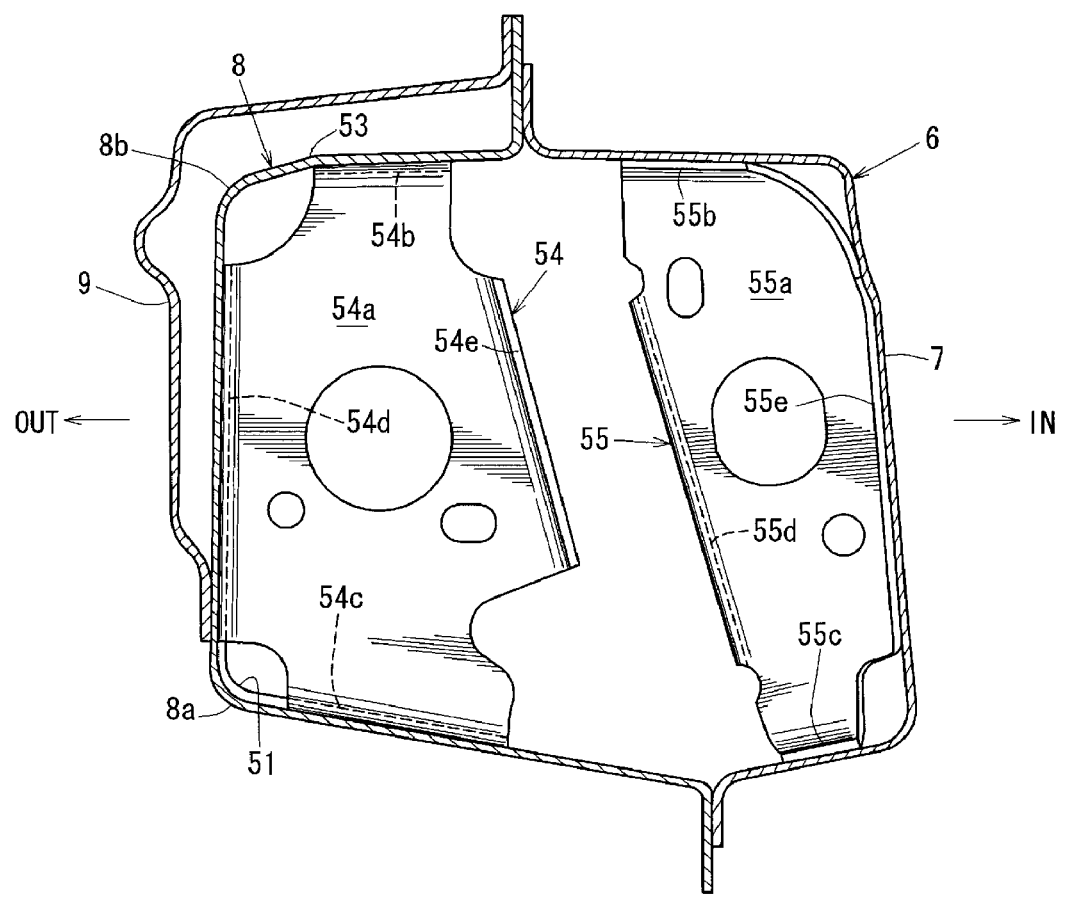
FIG. 14 is an elevation view showing an inside structure of a side sill, taken along line D-D of FIG. 12.
Figure 15:
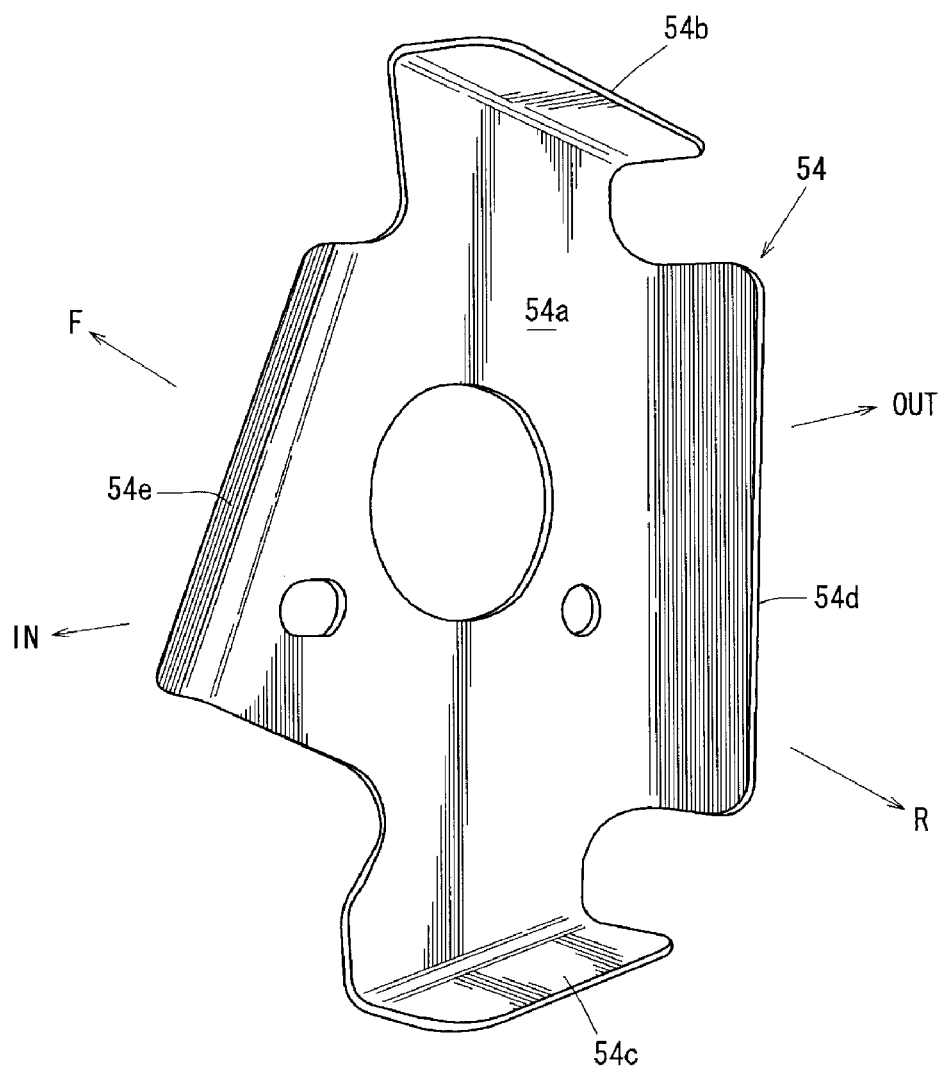
FIG. 15 is a perspective view of the gusset provided in a cross section of a side-sill reinforcement.

As shown in FIGS. 14 and 15, the outer gusset 54 is a node-forming member which is integrally formed by a main-face portion 54a which forms the node, an upper piece 54b which bends rearward from an upper end of the main-face portion 54a, a lower piece 54c which bends rearward from a lower end of the main-face portion 54a, an outer piece 54d which bends rearward from an outside end of the main-face portion 54a, an inner piece 54e which bends forward from an inside end of the main-face portion 54a. The plural outer gussets 54 . . . have substantially the same shape, respectively. The upper piece 54b, the outer piece 54d, the lower piece 54c of the outer gusset 54 are fixed to respective corresponding faces of the side-sill reinforcement 8 as shown in FIG. 14, so that the node is formed in the cross section of the side-sill reinforcement 8 by the outer gusset 54. Accordingly, the strength of the portion with the node formed against the crash impact can be improved, so that the strength of the side-sill reinforcement 8 can be improved as well.

As shown in FIG. 12, the above-described front and rear cross members 20, 40 which extend in the vehicle width direction are provided on the floor panel 1 at front and rear positions which are located in front of and in back of the center pillar 12, and the above-described reinforcing member 51 is arranged at the lower corner 8a of the side-sill reinforcement 8 between the front and rear cross members 20, 40. The reinforcing member 51 of the present embodiment is arranged at a central portion between the front and rear cross members 20, 40 as shown in FIG. 12. Further, the outer gusset 54 is provided at a position in the side-sill reinforcement 8 which corresponds to the rear cross member 40.

Further, as shown in FIG. 12, the above-described cross member 30 which extends in the vehicle width direction at the position corresponding to the center pillar 12 is provided on the floor panel 1 as the middle cross member. One end of the middle cross member 30 which is located on the side of the side sill 6 is positioned away from the side sill 6 by a specified distance, the connecting member 35 which connects the side-sill-side end of the middle cross member 30 to the side sill 6 is provided, the connecting member 35 has the lower strength compared to the middle cross member 30, and the strength of the connection area C of the connecting member 35 to the middle cross member 30 is higher than that of the connection area S of the connecting member 35 to the side sill (see FIGS. 1 and 8).

Thereby, at the initial stage, the crash load inputted via the center pillar 12 and the side sill 6 is received by the connection area S of the connecting member 35 to the side sill which has the lower strength, so that this connection area S crushes axially (in the vehicle width direction) absorbing the crash load, thereby absorbing the crash energy properly. After this, against the bending moment from the side sill 6, the crash load inputted is received by the connection area C of the connecting member 35 to the middle cross member 30 which has the higher strength, so that this connection area C can crush absorbing the bending load, thereby preventing the load from transmitting to the middle cross member 30 properly. Further, since the middle cross member 30 has the higher strength compared to the connecting member 35, the strength of the middle cross member 30 is high (large) enough to receive (stand) the inputted crash load. Accordingly, the axial compressive input (inputted load) and the bending input (inputted load) can be absorbed effectively by the connecting member 35, restraining the buckling of the middle cross member 30. Moreover, since the proper deformation of the lower portion of the center pillar 12 toward the vehicle inside can be ensured by the axial crushing of the connecting member 35, so that the upper portion of the center pillar 12 can be properly restrained from coming toward the vehicle inside.

Moreover, the connecting member 35 constitutes the seat-attaching bracket to support the seat for passenger (see FIGS. 7 and 9). Thereby, the seat-attaching bracket can be utilized as the connecting member properly.

Additionally, front and rear inner gussets 55 are provided inside the side-sill inner 7 at front and rear positions which are located in front of and in back of the cross member 30 so as to form a node in the cross section of the side-sill inner 7 as shown in FIGS. 12 and 14.

Figure 16:
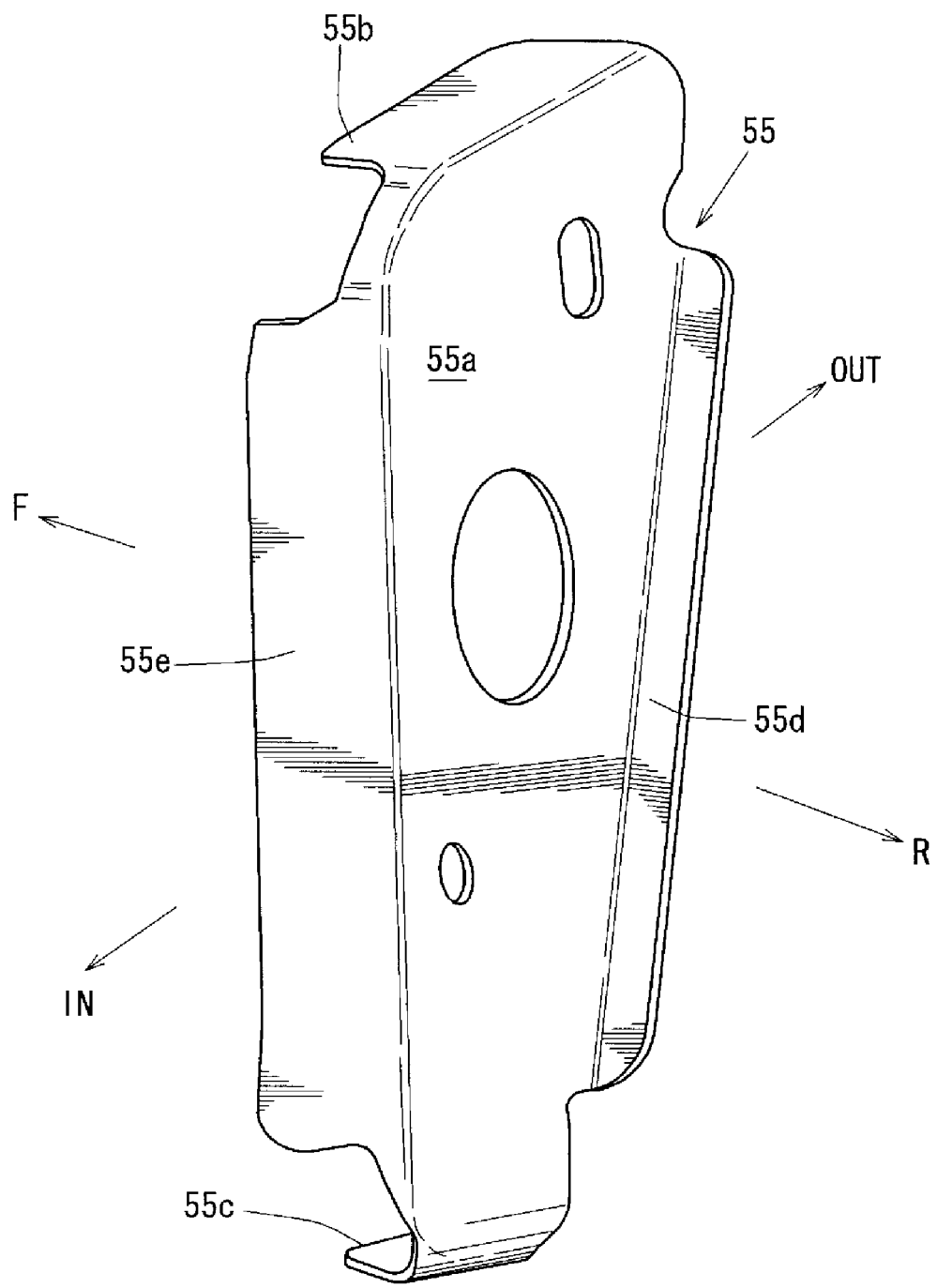
FIG. 16 is a perspective view of the gusset provided in a cross section of a side-sill inner.

As shown in FIGS. 14 and 16, the inner gusset 55 is a node-forming member which is integrally formed by a main-face portion 55a which forms the node, an upper piece 55b which bends forward from an upper end of the main-face portion 55a, a lower piece 55c which bends forward from a lower end of the main-face portion 55a, an outer piece 55d which bends rearward from an outside end of the main-face portion 55a, an inner piece 55e which bends forward from an inside end of the main-face portion 55a. The plural outer gussets 54 . . . have substantially the same shape, respectively. The upper piece 55b, the outer piece 55d, the lower piece 55c of the outer gusset 55 are fixed to respective corresponding faces of the side-sill reinforcement 7 as shown in FIG. 14, so that the node is formed in the cross section of the side-sill inner 7 by the outer gusset 55. Accordingly, the strength of the portion with the node formed can be improved, so that the strength of the side-sill inner 7 can be improved as well. Thus, the lower vehicle-body structure of a vehicle of the present embodiment comprises the side sill 6, the center pillar 12 which is connected to the side sill 6 at the lower end thereof, and the side-sill reinforcement 8 which is provided inside the side sill 6, the side-sill reinforcement 8 having the U-shaped cross section opening toward the vehicle inside, wherein the lower portion of the side-sill reinforcement 8 has a flexural structure to allow the side sill 6 to flexibly bend when the load of the vehicle side crash is inputted, and the upper portion of the side-sill reinforcement 8 which corresponds to the connection portion α to the center pillar has a load absorbing portion (the opening 52, the bending portion 53) to deform and absorb the load of the vehicle side crash.

Further, according to the lower vehicle-body structure of a vehicle of the present embodiment, the cross member 20 which extends in the vehicle width direction is provided on the floor panel 1 between the tunnel portion 2 and the side sill 6, the impact absorbing portion (notch 23) to absorb the impact of the vehicle side crash is formed near the outside connection end of the cross member 20 to the side sill, the reinforcing member (nut plate 24) is provided near the outside end of the body portion 20A of the cross member 20 so that its outside end 24a overlaps with the impact absorbing portion (notch 23) (see FIGS. 1 and 4).

According to this structure, the crash load can be absorbed by the above-described impact absorbing portion (notch 23), and the initial increase of the load acting on the body portion 20A of the cross member 20 can be reduced and thereby the buckling of the cross member 20 (a downward-bending deformation of a central portion of the cross member 20) can be restrained with the above-described overlap structure between the impact absorbing portion (notch 23) and the reinforcing member (nut plate 24). Further, the cross member 20 can be properly reinforced against the inputted load from the side sill 6 by the above-described reinforcing member (nut plate 24).

Moreover, the above-described impact absorbing portion is the notch 23 which is formed in such a manner that an outside corner end of the above-described cross member 20 is cut away (see FIG. 6). Thereby, the proper forming and processing of the impact absorbing portion (notch 23) can be ensured.

Further, the above-described reinforcing member (nut plate 24) which is provided near the outside end of the cross member 20 constitutes a seat-attaching member to fix a seat for passenger (see FIG. 4). Thereby, the seat-attaching member can be utilized properly as the reinforcing member.

Figure 17:
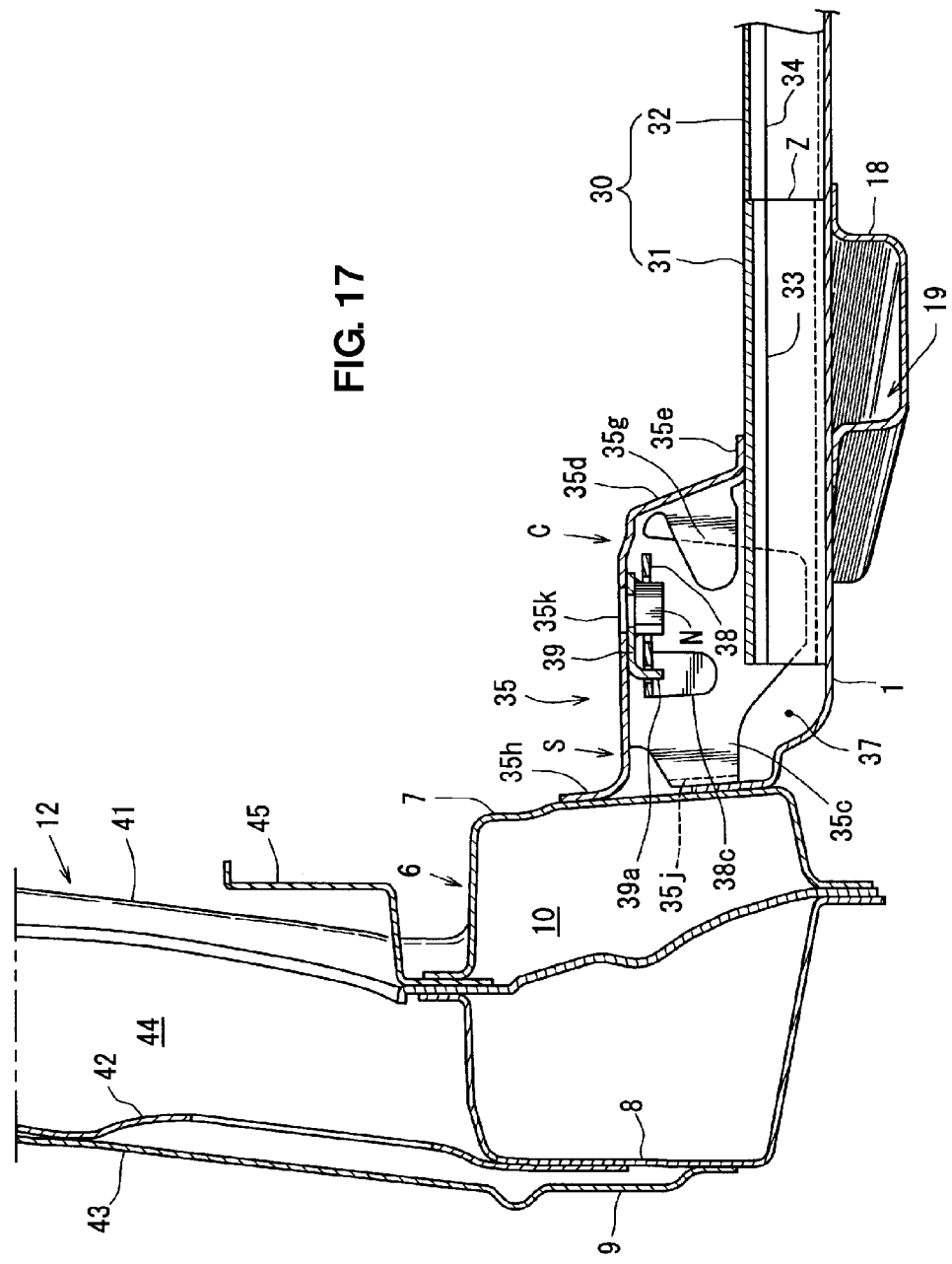
FIG. 17 is a sectional view showing a lower vehicle-body structure of a vehicle according to a modification of the first embodiment.

FIG. 17 is an elevation view showing a lower vehicle-body structure according to a modification of the above-described first embodiment. While the first cross member 31 and the second cross member 32 of the first embodiment are formed separately from each other, the third embodiment of FIG. 17 shows an example in which the first cross member 31 and the second cross member 32 are formed integrally.

That is, the first cross member 31 which is located on the outside is made of a relatively thick base member originally, and the second cross member 32 which is located on the outside is made of a relatively thin base member originally. Herein, these base members are joined together in advance to form an integrated plate member. This plate member is formed in a shape having a U-shaped cross section by pressing process. Thus, the first and second cross members 31, 32 are formed. Thereby, these members 31, 32 of the middle cross member 30 can be formed so as to have the properly high strength. The other structures shown in FIG. 17 have the same constitutions, operations and advantages as those of the above-described first embodiment. Thus, the same reference characters are used to denote the same structures and their detailed descriptions are omitted.

Figure 19:
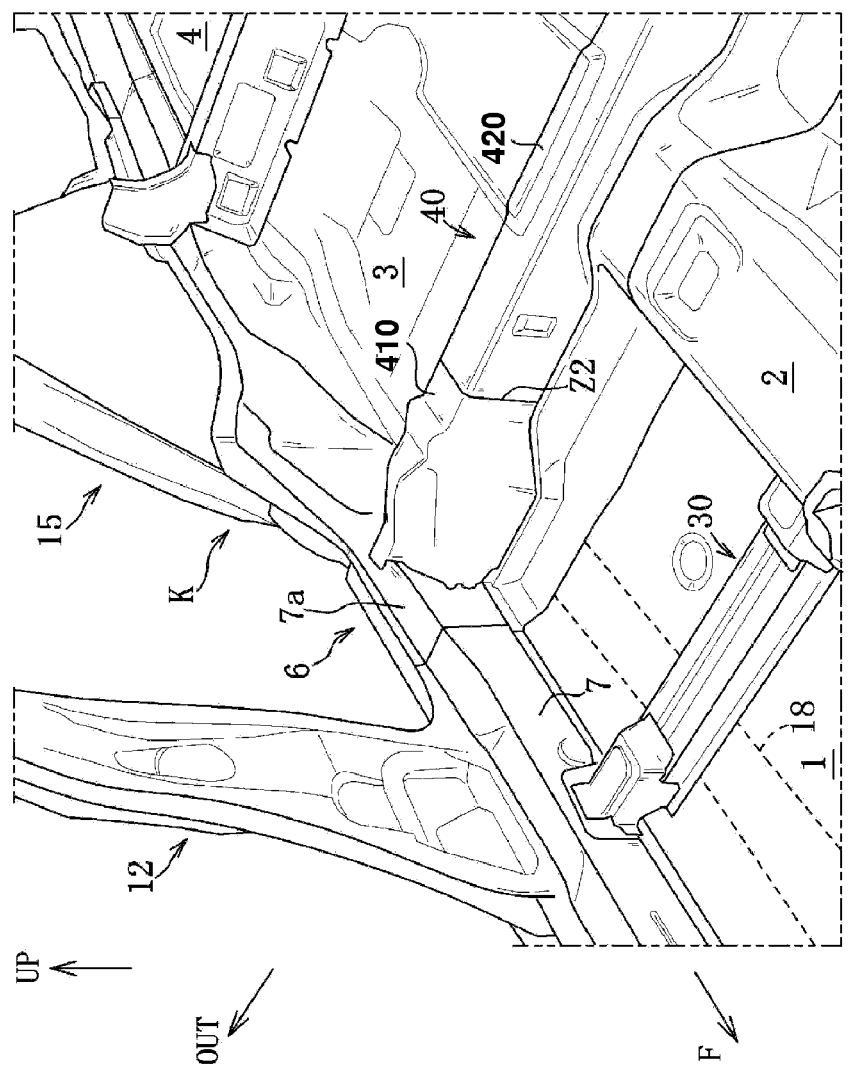
FIG. 19 is an enlarged view of a major portion of FIG. 2.
Figure 20:
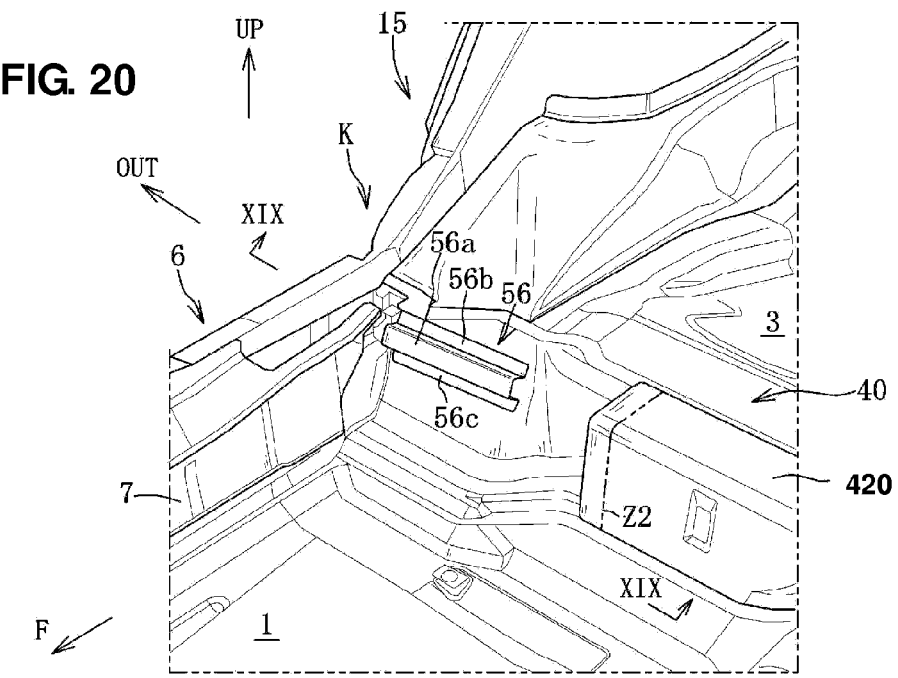
FIG. 20 is an enlarged perspective view showing a state in which a first outside cross member of FIG. 19 is removed.
Figure 21:
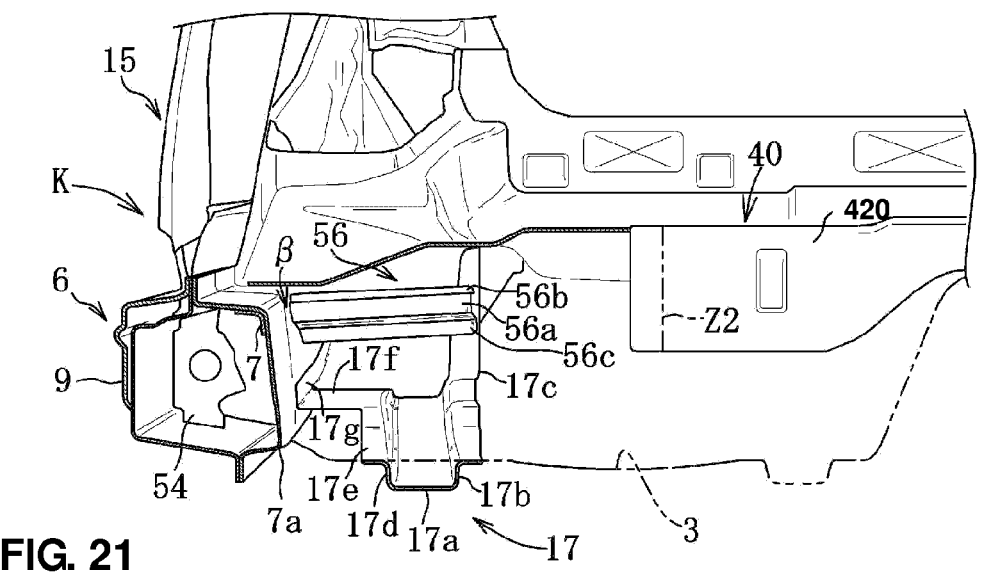
FIG. 21 is a sectional view taken along line XIX-XIX of FIG. 20.
Figure 22:
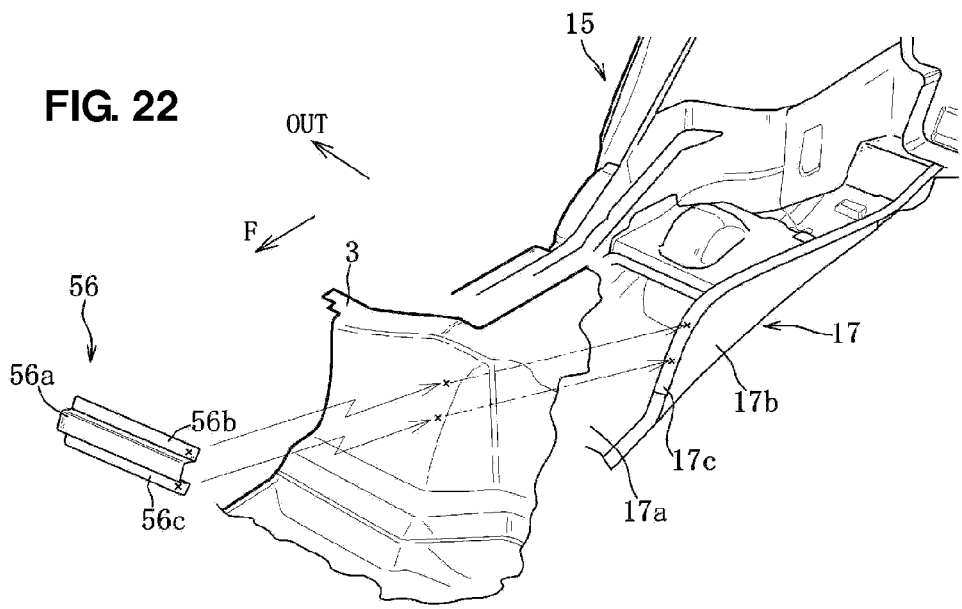
FIG. 22 is an exploded perspective view of a reinforcing member and a rear seat pan.
Figure 23:
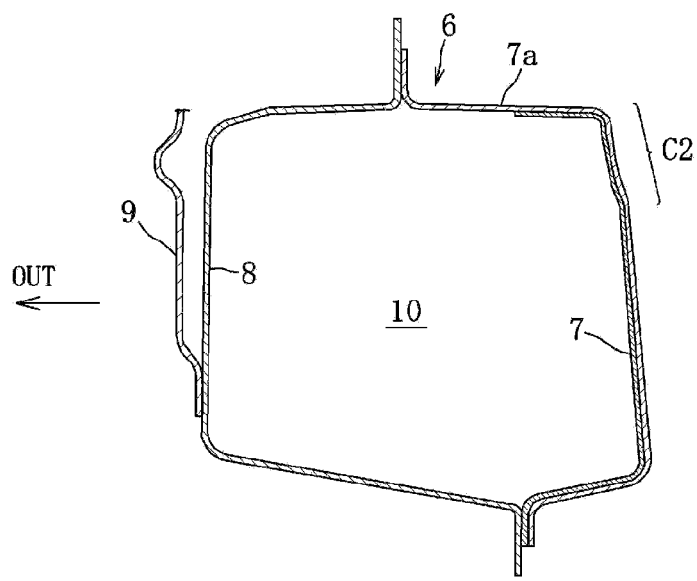
FIG. 23 is a sectional view of a rear portion of the side sill.

Moreover, FIG. 19 is an enlarged view showing a surrounding structure of the rear cross member 40 which extends in the vehicle width direction. FIG. 20 is an enlarged perspective view of a major portion in which a first outside cross member 41 is removed. FIG. 21 is a sectional view taken along line XIX-XIX of FIG. 20. FIG. 22 is an exploded perspective view of a reinforcing member 56 and a rear seat pan. FIG. 23 is a sectional view taken along line XXI-XXI of FIG. 20.

As shown in FIGS. 19 and 20, the side-sill inner 7 has a notch area at its rear portion in which part of the face of the side-sill inner 7 is cut away. In this notch area, the side-sill closed cross section 10 of the side sill 6 is formed by a rear member 7a which constitutes a rear area of the side-sill inner 7. That is, as shown in FIG. 23, in this rear area of the side sill 6, its lower end is formed with the side-sill reinforcement 8, the side-sill inner 7 and the rear member 7a which are joined together. Meanwhile, its upper end is formed with the joined to the side-sill reinforcement 8 and the rear member 7a which are joined together. Thus, the side-sill closed cross section 10 is formed.

As shown in FIGS. 19 and 21, the rear side frame 17 is connected to the rear member 7a of the side-sill inner 7 at its front portion, and extends rearward and upward obliquely. The front portion of the rear side frame 17 is arranged so as to face to the upper portion of the side-sill inner 7.

As shown in FIG. 21, the front portion of the rear side frame 17 comprises a rear-side-frame body portion 17a which has a U-shaped cross section, an inside flange 17c which extends inwardly from a tip of an inside wall portion 17b of the body portion 17a, an outside flange 17e which extends outwardly from a tip of an outside wall portion 17d of the body portion 17a, and a connecting portion 17f which further extends outwardly and horizontally from a tip of the outside flange 17e and connects to the rear member 7a of the side-sill inner 7 via a connecting wall portion 17g. Front end portions of the body portion 17a, the inside wall portion 17b and the outside wall portion 17d are connected to a rear end portion of the floor frame 18. A front portion of the rear side frame 17 is connected to a lower end face of the rear seat pan 3 via the inside flange 17c and the outside flange 17e.

The rear seat pan 3 forms a slant kick-up portion K which rises obliquely rearward and upward along the extension shape of the rear side frame 17. In the kick-up area K, the rear seat pan 3 is connected to the outside flange 17e, the inside flange 17c, and the rear member 7a of the side-sill inner 7, so that a closed cross section which extends in the vehicle longitudinal direction is formed by the rear seat pan 3, the rear member 7a, and the rear side frame 17. A front portion of the rear side frame 17 is connected to the rear member 7a at a position which corresponds to the rear portion of the kick-up portion K.

The rear cross member 40 is arranged at the font portion of the rear seat pan 3 which forms the kick-up portion K, and extends over the tunnel portion 2 in the vehicle width direction between the right and left side sills 6. The third cross member 40 comprises an outside rear cross member 410 (its outside portion) and an inside rear cross member 420 (its inside portion). These members 410, 420 have a closed cross section which extends in the vehicle width direction, cooperating with the rear seat pan 3. The outside rear cross member 410 has a higher-strength structure compared with the inside rear cross member 420. This higher-strength structure may be constituted by setting the thick of the outside cross member 410 to be thicker than that of the inside rear cross member 420, or by making the outside cross member 410 of the high-tension steel sheet and making the inside cross member 420 of the normal steel sheet.

As shown in FIGS. 19 and 21, the outside cross member 410 and the inside cross member 420 are made separately, and the outside cross member 410 is connected onto the inside cross member 420 so as to overlap by a specified length. A border Z2 between the outside cross member 410 and the inside cross member 420 is positioned at a location which is offset toward the tunnel portion 2.

As shown in FIGS. 20 through 22, the reinforcing member 56 which has a U-shaped cross section is arranged in a closed cross section which is formed by the outside cross member 41 and the rear seat pan 3. This reinforcing member 56 is provided on the front portion of the kick-up portion K which corresponds to an upper-end side portion of the side sill 6 with a gap β away from the side-sill inner 7. The reinforcing member 56 comprises a body portion 56a which has a U-shaped cross section, an upper flange 56b which extends from an upper end of the body portion 56a, and a lower flange 56c which extends from a lower end of the body portion 56a. The reinforcing member 56 is made of a long and narrow (slender) member which extends in the vehicle width direction so as to overlap with the rear side frame 17 in the plan view and to be arranged from the inside flange 17c to the connecting wall portion 17g of the rear side frame 17.

As shown in FIG. 22, the flanges 56b, 56c of the reinforcing member 56 are fixed to the front face of the rear seat pan 3, and form a closed cross section together with the rear seat pan 3. Inside ends of the flanges 56b, 56c of the reinforcing member 56 are connected to the inside flange 17c of the rear side frame 17 via the rear seat pan 3. Further, as shown in FIG. 21, the outside end of the of the reinforcing member 56 is a specified distance away from the rear member 7a of the side-sill inner 7 so that the gap β exits from the rear member 7a. This gap β is set to be shorter than the distance from the outside end of the outside cross member 31 to the side-sill inner 7.

On the outside of the reinforcing member 56 is provided the above-described outer gusset 54 (see FIG. 12). That is, the reinforcing member 56 is provided on the front portion of the kick-up portion K which corresponds to an upper-end side portion C2 (see FIG. 23) of the side sill 6 at a specified position which corresponds to an area from the inside wall portion 17b to the connecting wall portion 17g of the rear side frame 17, and the outer gusset 54 is provided in the cross section of the side-sill reinforcement 8 at a position which corresponds to the reinforcing member 56.

Figure 24A:
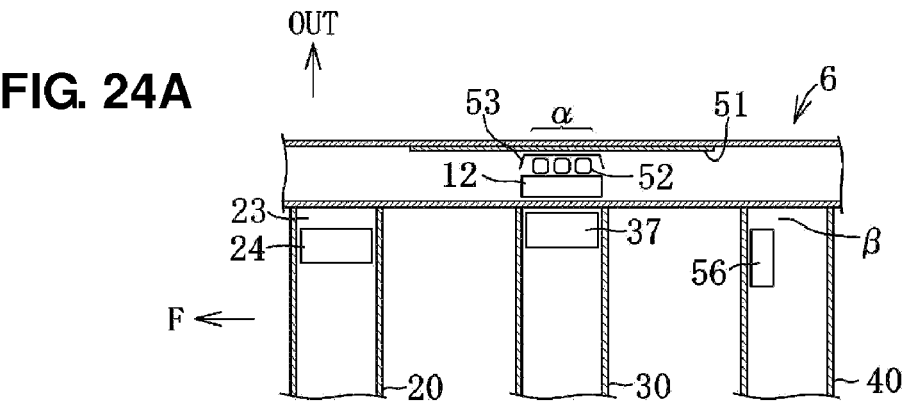
FIG. 24A is an explanatory diagram of move of the lower vehicle-body structure before the vehicle side crash.
Figure 24B:
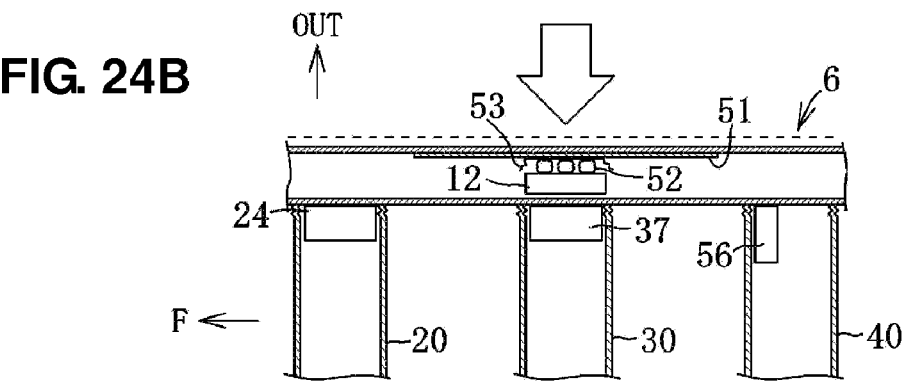
FIG. 24B is an explanatory diagram of move of the lower vehicle-body structure at an initial stage of the vehicle side crash.
Figure 24C:
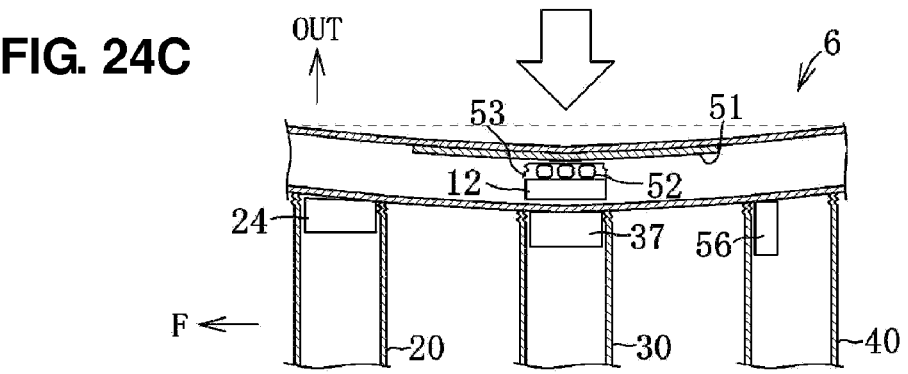
FIG. 24C is an explanatory diagram of move of the lower vehicle-body structure at a late stage of the vehicle side crash.
Figure 25:
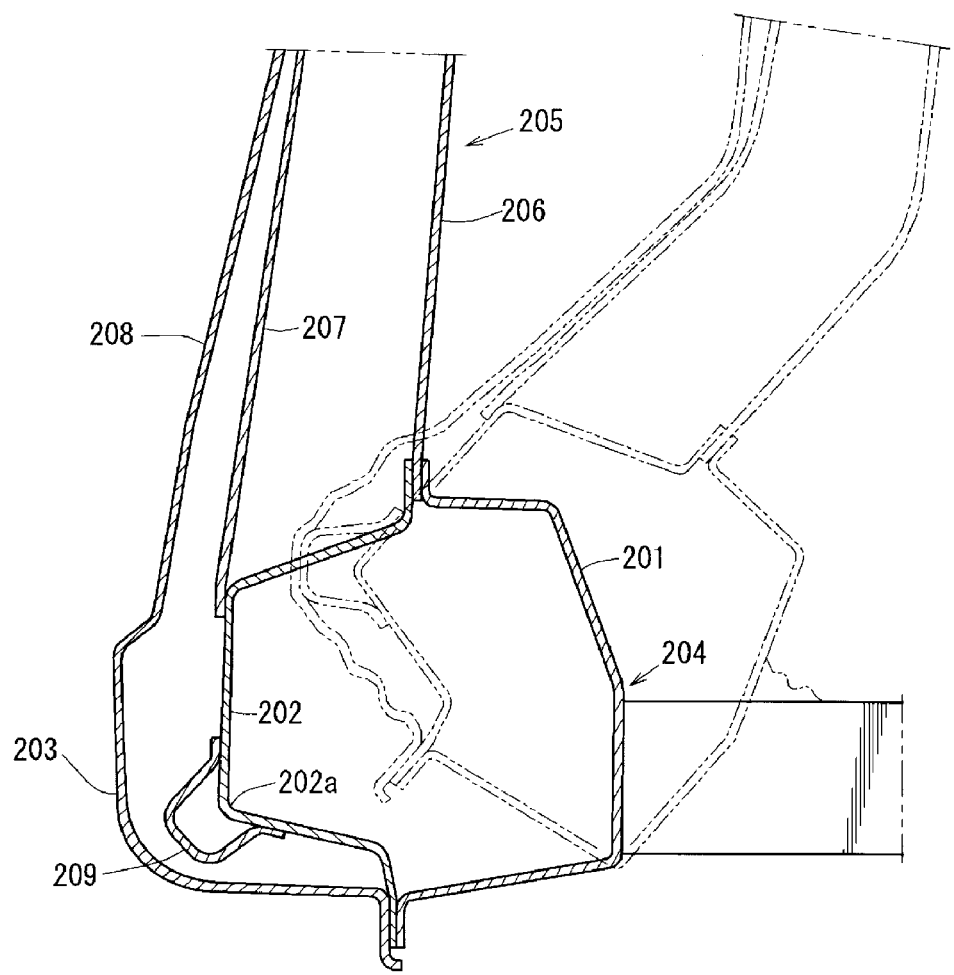
FIG. 25 is an elevation view showing a conventional lower vehicle-body structure of a vehicle.

Hereinafter, the operations and advantages of the lower vehicle-body structure of the present embodiment will be described specifically referring to FIGS. 24A-C. FIG. 24A shows its move before the vehicle side crash, FIG. 24B shows its move at an initial stage of the vehicle side crash, and FIG. 24C shows its move at a late stage of the vehicle side crash. Herein, the plan view of the right-side lower vehicle-body structure is illustrated for an easy explanation.

As shown in FIG. 24A, the front cross member 20, the middle cross member 30, and the rear cross member 40 are arranged in order from the vehicle front, extending in the vehicle width direction between the pair of side sills 6. The center pillar 12 is arranged at the position corresponding to the middle cross member 30. The front cross member 20 has the notch 23 and the nut plate 24 which is arranged away from the side-sill inner 7. The middle cross member 30 has the space 37 between the lower end of the connection area to the side sill and the upper portion of the floor panel 1. The rear cross member 40 has the reinforcing member 56 at the font portion of the kick-up portion K which corresponds to the upper-end side portion of the side sill 6. Herein, the gap β exits between the reinforcing member 56 and the side-sill inner 7. The side sill 6 has the deformation promoting portion which comprises the openings 52 and the bending portion 53 at its upper position on the outside of the center pillar 12, and the reinforcing member 51 and the outer gusset 54 therein.

In case the vehicle side crash occurs, at firs the connection portion α of the side sill 6 to the center pillar 12 where the openings 52 and the bending portion 53 are provided deforms. Herein, the openings 52 and the bending potion 53 constitute the weak portion formed at the upper face of the side-sill reinforcement 8, so that the initial crash load is absorbed by the bucking deformation of this connection portion α of the side sill 6. The rest of magnitude of the crash load which has not been absorbed by this buckling deformation is transmitted to the cross members 20, 30, 40 from the side sill 6.

As shown in FIG. 24B, the crash load inputted to the side sill 6 causes respective crush deformations of the cross members 20, 30, 40 almost at the same time. Herein, since the side-sill reinforcing member 51 is arranged on the inside of the lower corner 8a of the side-sill reinforcement, the side sill 6 may not have a V-shaped buckling toward the vehicle inside even if the crash load acts on the connection portion α. Meanwhile, since the space 37 is formed between the lower end of the connection area S of the connecting member 35 and the upper portion of the floor panel 1, the middle cross member 30 has the compressive deformation caused by the crash load in the area where the space 37 is formed.

Further, since the notch 23 is formed in such a manner that part of the ridgelines X, Y having the high strength near the connection portion of the cross member 20 to the side-sill inner 7 is cut away and the nut plate 24 is provided away from the side-sill inner 7, the front cross member 20 has the compressive deformation cased by the crash load in the area where the side-sill inner 7 is away from the nut plate 24. Herein, since the notch 23 is farther away from the side-sill inner 7 than the nut plate 24, the compressive deformation of the front cross member 20 may not be obstructed.

Moreover, since the gap β is formed between the reinforcing member 56 and the rear member 7a of the side-sill inner 7, the rear cross member 40 has the compressive deformation caused by the crash load in the area where the gap β is formed. Further, since the reinforcing member 56 is arranged at the position corresponding to the upper-end side portion C2 of the side sill 6, even if the side sill 6 starts rotating toward the vehicle inside, the rotation of the side sill 6 is prevented at a point when the outside end of the reinforcing member 56 contacts the rear member 7a.

When the vehicle side crash progresses, as shown in FIG. 24C, the side sill 6 has the bending deformation toward the vehicle inside, having support points of the front and rear cross members 20, 40, and the middle cross member 30 has the compressive deformation in the rear where the space 37 is formed. Since the side-sill reinforcing member 51 is arranged on the inside of the lower corner 8a of the side-sill reinforcement 8, even if the load is inputted from the connection portion α, the side sill 6 is prevented from having a V-shaped bending toward the vehicle inside.

After the front cross member 20 has the compressive deformation in the area where the side-sill inner 7 is away from the nut plate 24, the nut plate 24 as the reinforcing member prevents the side sill 6 from moving toward the vehicle inside. The front cross member 20 supports the crash load inputted from the center pillar 12 via the side sill 6, cooperating with the nut plate 24.

After the rear cross member 40 has the compressive deformation in the area of the gap β, the reinforcing member 56 prevents the inward move of the side sill 6. The rear cross member 40 supports the crash load inputted from the center pillar 12 via the side sill 6, cooperating with the reinforcing member 56. Herein, since the outer gusset 54 is arranged at the position which corresponds to the rear cross member 40, particularly to the reinforcing member 56, the support of the side sill 6 by the rear cross member 40 is possible, without any buckling of the connection portion of the side sill 6 to the rear cross member 40. Further, since the reinforcing member 56 is connected to the inside flange 17c of the rear-side frame 17 via the rear seat pan 3 and the front end of the body portion 17a of the rear-side frame 17 is connected to the rear end of the floor frame 18, the support strength against the crash load can be strengthened.

Since the compressive area of the space 37 is set to be relatively long compared to the off-area of the nut plate 24 at the front cross member 20 or the gap β of the rear cross member 40, the compressive deformation of the middle cross member 30 and the bending deformation of the side sill 6 can be allowed, thereby absorbing the crash load effectively. Further, the rotation of the side sill 6 can be prevented by the contact of the outside end of the reinforcing member 56 with the rear member 7a.

Since the reinforcing member 56 is provided on the front portion of the kick-up portion K which corresponds to the upper-end side portion C2 of the side-sill inner 7 as described above, the inside portion of the side sill 6 which is positioned in back of the center pillar 12 can be supported even in case the side sill does not break at the vehicle side crash, so that the side sill 6 can be properly restrained from coming toward the vehicle inside. Further, since the reinforcing member 56 supports the upper-end side portion C2 of the side sill 6, the rotation of the side sill 6 toward the vehicle inside can be restrained, so that the vehicle constituting members can be properly restrained from coming toward the vehicle inside. Further, since the reinforcing member 56 is provided on the front portion of the kick-up portion K at the position which is located between the inside flange 17c and the connecting wall portion 17g of the rear side frame 17, so that it can be arranged at almost the same area as the rear side frame 17 in the elevation view. Accordingly, the side sill 6 can be surely restrained from coming and rotating toward the vehicle inside, without any increased layout space.

Even in case the both-side ends of the front floor panel 1 in front of the kick-up portion K are connected to the lower portions of the pair of side-sill inners 7, the rotation of the side sill 6 toward the vehicle inside around the lower portion of the side sill 6 can be effectively restrained, so that the vehicle constituting members, such as the rotating pillar 12 or door, can be properly restrained from coming toward the vehicle inside.

Since the rear cross member 40 which connects the pair of side sills 6 is provided on the front face of the kick-up portion K, and the reinforcing member 56 is provided in the closed cross section which is formed by the rear cross member 40 and the rear seat pan 3, the support strength of the reinforcing member 56 can be increased, and the move and rotation of the side sill 6 toward the vehicle inside can be restrained by cooperation of the reinforcing member 56 and the rear cross member 40. Further, a proper layout of the reinforcing member 56 can be achieved by utilizing this closed cross section by the rear cross member 40 and the rear seat pan 3.

Embodiment 2

Figure 18:
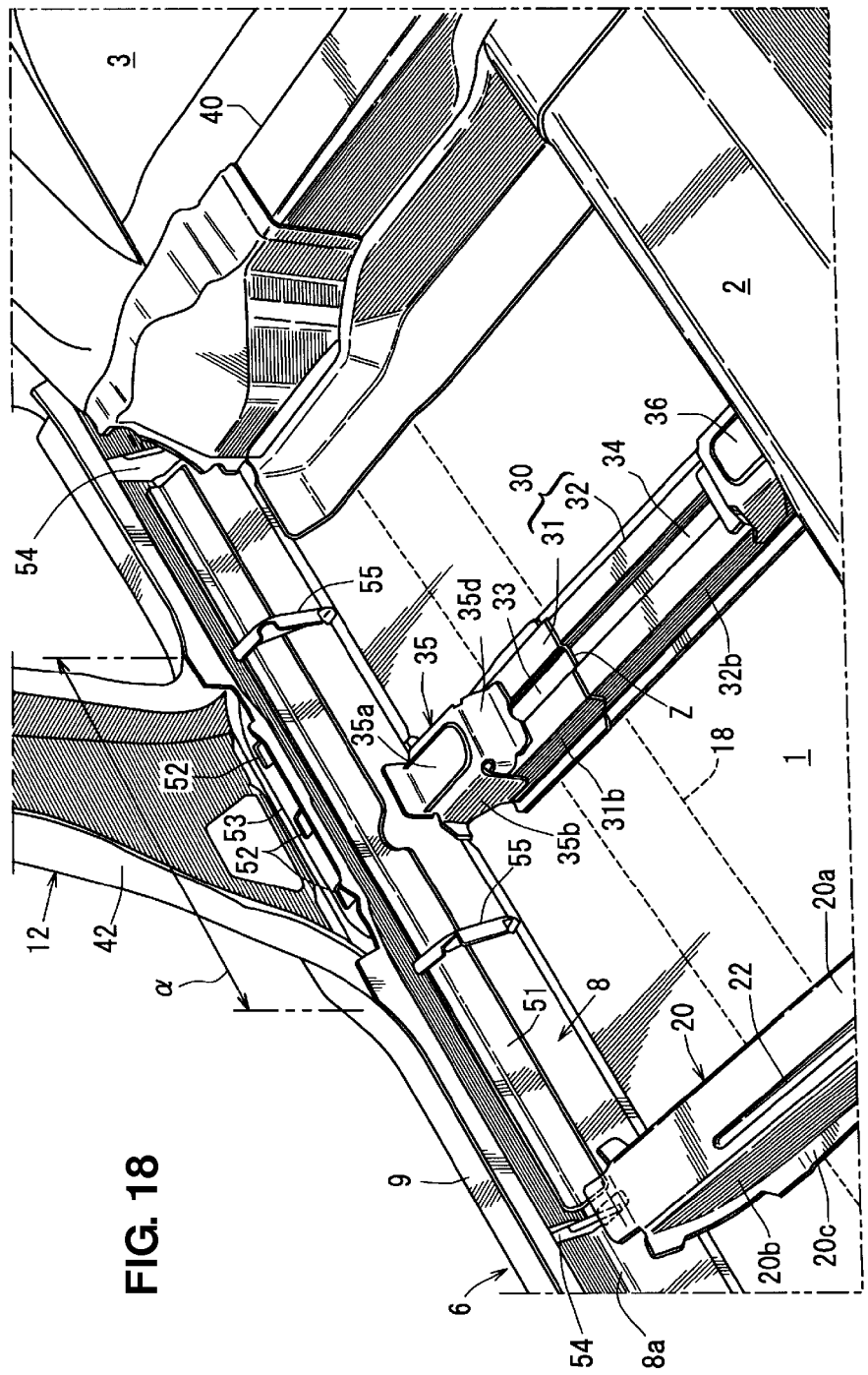
FIG. 18 is a perspective view showing a lower vehicle-body structure of a vehicle according to a second embodiment.

In place of the disposition structure of the reinforcing member 51 and the outer gusset 54 which are shown in FIG. 12, another disposition structure of those members 51, 54 which is shown in FIG. 18 may be applied. That is, in the structure shown in FIG. 18 (herein, FIG. 18 is a perspective view showing the inside structure of the side sill 6, in which illustrations of the side-sill inner 7, the center-pillar inner 41 and others are omitted, like FIG. 12), the front and rear outer gussets 54, 54 are provided inside the side-sill reinforcement 8 at specified positions which correspond to the front and rear cross members 20, 40 in front and back of the center pillar 12 so as to form the node in the cross section of the side-sill reinforcement 8, and the reinforcing member 51 is arranged over a range between the front and rear gussets 54, 54. That is, the outer gussets 54, 54 are located at the positions of the cross members 20, 40, and the reinforcing member 51 is located between these gussets 54, 54. In FIG. 18, the same portions as those in FIG. 12 are denoted by the same reference characters, detailed descriptions of which are omitted here. In the figures, an arrow F shows the vehicle forward direction, an arrow R shows the vehicle rearward direction, an arrow IN shows the vehicle inside direction, an arrow OUT shows the vehicle outside direction, and an arrow UP shows the vehicle upward direction.

Hereinafter, the operations of the above-described embodiments will be described. The reinforcing member 51 is provided at the lower corner 8a of the side-sill reinforcement 8 of the side sill 6, so that the side sill can be reinforced by the reinforcing member 51 and the flexible bending of the side sill can be ensured by the longitudinal length, i.e., a span of the reinforcing member 51. Accordingly, when the crash load is inputted to the side sill 6 via the center pillar 12 at the vehicle side crash, the side sill 6 can be made bend flexibly (toward the vehicle inside) without breaking against this crash load, thereby restraining the side sill 6 from coming toward the vehicle inside.

As described above, the lower vehicle-body structure of a vehicle of the above-described embodiments comprises the side sill 6, the center pillar 12 which is connected to the side sill 6 at its lower end, the side-sill reinforcement 8 which is provided inside the side sill 6, the side-sill reinforcement 8 having the U-shaped cross section opening toward the vehicle inside, the reinforcing member 51 which is provided at the lower-outside corner 8a of the side-sill reinforcement 8 so as to extend in the vehicle longitudinal direction including the connection portion α of the side sill 6 to the center pillar for straining deformation of the corner 8a, and the deformation promoting portion (the opening 52 and/or the bending portion 53) which is provided at the upper portion (upper corner 8b) of the side-sill reinforcement 8 at the specified position which corresponds to the connection portion α for prompting deformation of the upper portion (upper corner 8b) of the side-sill reinforcement 8 (see FIGS. 12 and 13).

According to this structure, since the reinforcing member 51 is provided at the lower-outside corner 8a of the side-sill reinforcement 8, the side sill 6 can be properly made bend flexibly without breaking against the load of the vehicle side crash inputted via the center pillar 12, thereby restraining the side sill 6 from coming toward the vehicle inside. Further, since the deformation promoting portion (opening 52, bending portion 53) is provided at the upper portion of the side-sill reinforcement 8 at the specified position corresponding to the connection portion α, the crash load can be properly absorbed. Moreover, the proper deformation of the lower portion of the center pillar 12 toward the vehicle inside can be ensured by the above-described flexible bending of the side sill 6, so that the upper portion of the center pillar 12 can be properly restrained from coming toward the vehicle inside.

Further, the deformation promoting portion (opening 52, bending portion 53) is provided within the range of the connection portion α of the side-sill reinforcement 8 to the center pillar, and the reinforcing member 51 is provided over the specified range which is longer than the above-described range in the vehicle longitudinal direction (see FIG. 12). Thereby, since the deformation promoting portion (opening 52, bending portion 53) is provided within the range of the connection portion of the side-sill reinforcement 8 to the center pillar, the proper absorption of the crash load at the connection portion α can be ensured. Further, since the reinforcing member 51 is provided over the specified range which is longer than the above-described range in the vehicle longitudinal direction, the flexile bending of the side sill 6 can be ensured surely, thereby restraining the side sill from coming toward the vehicle inside. Thus, both the crash-load absorption of the connection portion α the restraint of the side sill 6 from coming toward the vehicle inside can be achieved.

Moreover, the deformation promoting portion comprises the weak portion (opening 52) which is provided at the upper face of the side-sill reinforcement 8 (see FIG. 13). Thereby, the deformation promotion of the upper portion, in particular, the upper corner 8b of the side-sill reinforcement 8 can be achieved properly by the weak portion (opening 52).

Meanwhile, the deformation promoting portion comprises the bending portion 53 which is provided at the upper face of the side-sill reinforcement 8 and causes buckling of the upper face of the side-sill reinforcement 8 (see FIG. 13). Thereby, since the bending portion causes the buckling of the upper face of the side-sill reinforcement 8 when the crash load is inputted, the deformation promotion of the upper portion, in particular, the upper corner 8b of the side-sill reinforcement 8 can be achieved, thereby absorbing the crash load properly.

Further, the gussets (outer gussets 54, 54) are provided inside the side-sill reinforcement 8 at the front and rear positions of the reinforcing member 51 so as to form the node in the cross section of the side-sill reinforcement 8 (see FIG. 12). Thereby, the strength of portions with the gussets (outer gussets 54, 54) provided increases, so that the crash load can be surely received by the high-strength portions (disposition portions of the outer gussets 54, 54), and the reinforcing member 51 can be properly made bend flexibly at its center. Thus, the further proper flexible bending of the side sill 6 can be provided with the reinforcing member 51 and the outer gussets 54, 54.

Moreover, the front and rear cross members 20, 40 which extend in the vehicle width direction are provided on the floor panel 1 at the front and rear positions which are located in front of and in back of the center pillar 12, and the reinforcing member 51 is arranged between the front and rear cross members 20, 40 (see FIG. 12). Thereby, the crash load can be received surely by the front and rear cross members 20, 40, and the side sill 6 can be properly made bend flexibly by the reinforcing member 51 between these members 20, 40.

Additionally, the front and rear gussets (outer gussets 54, 54) are provided inside the side-sill reinforcement 8 at specified positions which correspond to the front and rear cross members 20, 40 so as to form the node in the cross section of the side-sill reinforcement 8, and the reinforcing member 51 is arranged over the range between the front and rear gussets (outer gussets 54, 54) (see FIG. 18). Thereby, the crash load can be received further surely by the front and rear cross members 20, 40 and the front and rear gussets (outer gussets 54, 54), and the side sill 6 can be further properly made bend flexibly by the reinforcing member 51 which is arranged over the range between the front and rear gussets (outer gussets 54, 54).

Further, the reinforcing member 51 is arranged at the central portion between the front and rear cross members 20, 40 (see FIG. 12). Thereby, the above-described flexible bending of the side sill 6 can be achieved properly even if the longitudinal length of the reinforcement member 51 is short.

Moreover, the middle cross member 30 which extends in the vehicle width direction is provided on the floor panel 1 at the specified position which corresponds to the center pillar 12 (see FIG. 12). Thereby, the load input via the center pillar 12 at the vehicle side crash is received directly by the middle cross member 30, thereby restraining the buckling of the side sill 6 properly. Further, since the side-sill reinforcement 8 is configured to crush easily at the deformation promoting portion (opening 52, bending portion 53), the rotational moment (bending moment) caused by the inclination (falling down toward the vehicle inside) of the center pillar 12 may be weakened, so that buckling of the middle cross member 30 can be restrained properly.

Also, the side sill 6 includes the side-sill inner 7, and the front and rear gussets (inner gussets 55) are provided inside the side-sill inner 7 at the front and rear positions which are located in front of and in back of the middle cross member 30 so as to form the node in the cross section of the side-sill inner 7 (see FIGS. 12 and 14). Thereby, since the crash load from the center pillar 12 at the vehicle side crash can be easily transmitted to the middle cross member 30 via the gussets (inner gussets 55) and the side sill inner 7, the load dispersion can be properly achieved.

Moreover, the lower vehicle-body structure of a vehicle of the present embodiments comprises the side sill 6, the center pillar 12 which is connected to the side sill 6 at its lower end, and the side-sill reinforcement 8 which is provided inside the side sill 6, the side-sill reinforcement 8 which has the U-shaped cross section opening toward the vehicle inside, wherein the lower portion of the side-sill reinforcement 8 has the flexural structure (the structure by the reinforcing member 51) to allow the side sill 6 to bend when the load of the vehicle side crash is inputted, and the upper portion of the side-sill reinforcement 8 which corresponds to the connection portion α to the center pillar has the load absorbing portion (opening 52 and/or bending portion 53) to deform and absorb the load of the vehicle side crash (see FIGS. 12 and 13). Accordingly, the side sill 6 can be properly made bend flexibly without breaking against the load of the vehicle side crash inputted via the center pillar 12, thereby restraining the side sill 6 from coming toward the vehicle inside. Further, since the load absorbing portion (opening 52, bending portion 53) is provided at the upper portion of the side-sill reinforcement 8 at the specified position corresponding to the connection portion α, the crash load can be properly absorbed. Moreover, the proper deformation of the lower portion of the center pillar 12 toward the vehicle inside can be ensured by the above-described flexible bending of the side sill 6, so that the upper portion of the center pillar 12 can be properly restrained from coming toward the vehicle inside.

The present invention should not be limited to the above-described embodiments, and any other modifications and improvements may be applied within the scope of a sprit of the present invention.

What is claimed is:

1. A lower vehicle-body structure of a vehicle, comprising:
   a side sill including a side sill inner and a side sill outer;
   a center pillar connected to said side sill at a lower end thereof;
   a side-sill reinforcement provided inside said side sill having the side sill inner and the side sill outer, the side-sill reinforcement having a U-shaped cross section opening toward a vehicle inside;
   a reinforcing member provided at a lower-outside corner of said side-sill reinforcement so as to extend in a vehicle longitudinal direction including a connection portion of the side sill to the center pillar for straining deformation of the corner; and
   a deformation promoting portion provided at an upper face of the side-sill reinforcement at a specified position which corresponds to said connection portion for prompting deformation of the upper portion of the side-sill reinforcement.

2. The lower vehicle-body structure of a vehicle of claim 1, wherein said deformation promoting portion is provided within a range of said connection portion of the side-sill reinforcement to the center pillar, and said reinforcing member is provided over a specified range which is longer than said range in the vehicle longitudinal direction.

3. The lower vehicle-body structure of a vehicle of claim 1, wherein said deformation promoting portion comprises a weak portion which is provided at the upper face of the side-sill reinforcement.

4. The lower vehicle-body structure of a vehicle of claim 1, wherein said deformation promoting portion comprises a bending portion which is provided at the upper face of the side-sill reinforcement and causes buckling of the upper face of the side-sill reinforcement.

5. The lower vehicle-body structure of a vehicle of claim 1, wherein gussets are provided inside said side-sill reinforcement at front and rear positions of said reinforcing member so as to form a node in a cross section of the side-sill reinforcement.

6. The lower vehicle-body structure of a vehicle of claim 1, wherein front and rear cross members extending in a vehicle width direction are provided on a floor panel at front and rear positions which are located in front of and in back of said center pillar, and said reinforcing member is arranged between the front and rear cross members.

7. The lower vehicle-body structure of a vehicle of claim 6, wherein front and rear gussets are provided inside said side-sill reinforcement at specified positions which correspond to said front and rear cross members so as to form a node in a cross section of the side-sill reinforcement, and said reinforcing member is arranged over a range between the front and rear gussets.

8. The lower vehicle-body structure of a vehicle of claim 6, wherein said reinforcing member is arranged at a central portion between said front and rear cross members.

9. The lower vehicle-body structure of a vehicle of claim 1, wherein a middle cross member extending in a vehicle width direction is provided on a floor panel at a specified position which corresponds to said center pillar.

10. The lower vehicle-body structure of a vehicle of claim 9, wherein an end of said middle cross member which is located on the side of said side sill is positioned away from the side sill by a specified distance, a connecting member which connects said side-sill-side end of the middle cross member to the side sill is provided, said connecting member has a lower strength compared to the middle cross member, and the strength of a connection area of the connecting member to the middle cross member is higher than that of another connection area of the connecting member to the side sill.

11. The lower vehicle-body structure of a vehicle of claim 10, wherein said connecting member constitutes a seat-attaching bracket to support a seat for passenger.

12. The lower vehicle-body structure of a vehicle of claim 9, wherein front and rear gussets are provided inside said side-sill inner at front and rear positions which are located in front of and in back of said middle cross member so as to form a node in a cross section of the side-sill inner.

13. The lower vehicle-body structure of a vehicle of claim 1, wherein a cross member which extends in a vehicle width direction is provided on a floor panel between a tunnel portion of the floor panel and the side sill, an impact absorbing portion to absorb an impact of a vehicle side crash is formed near an outside connection end of said cross member to the side sill, another reinforcing member is provided near the outside end of the cross member so that an outside end thereof overlaps with said impact absorbing portion.

14. The lower vehicle-body structure of a vehicle of claim 13, wherein said impact absorbing portion is a notch which is formed in such a manner that an outside corner end of said cross member is cut away.

15. The lower vehicle-body structure of a vehicle of claim 13, wherein said reinforcing member which is provided near the outside end of the cross member constitutes a seat-attaching member to fix a seat for passenger.

16. The lower vehicle-body structure of a vehicle of claim 1, further comprising a pair of rear side frames which is provided behind a pair of the side sills and extends in the vehicle longitudinal direction, and a slant kick-up portion which rises rearward and upward between a front floor panel and a rear floor panel, wherein a front portion of the rear side frame is connected to an inside of the side sill which corresponds to a rear portion of the kick-up portion, and a reinforcing member for restraining a rotation of the side sill is provided on a front portion of the kick-up portion which corresponds to an upper-end side portion of the side sill at a specified position which overlaps with the rear side frame in a plan view.

17. The lower vehicle-body structure of a vehicle of claim 16, wherein both-side ends of the front floor panel in front of the kick-up portion are connected to inside-lower portions of the side sills.

18. The lower vehicle-body structure of a vehicle of claim 16, wherein a cross member which connects the pair of side sills is provided on a front face of said kick-up portion, and said reinforcing member is provided in a closed cross section which is formed by said cross member and the rear floor panel.

19. A lower vehicle-body structure of a vehicle, comprising:
   a side sill;
   a center pillar connected to said side sill at a lower end thereof; and
   a side-sill reinforcement provided inside said side sill, the side-sill reinforcement having a U-shaped cross section opening toward a vehicle inside,
   wherein a lower portion of the side-sill reinforcement has a flexural structure to allow said side sill to bend when a load of a vehicle side crash is inputted, and an upper portion of the side-sill reinforcement which corresponds to a connection portion to the center pillar has a load absorbing portion to deform and absorb the load of the vehicle side crash.

20. A lower vehicle-body structure of a vehicle, comprising:
   a side sill;
   a center pillar connected to said side sill at a lower end thereof;
   a side-sill reinforcement provided inside said side sill, the side-sill reinforcement having a U-shaped cross section opening toward a vehicle inside;
   a reinforcing member provided at a lower-outside corner of said side-sill reinforcement so as to extend in a vehicle longitudinal direction including a connection portion of the side sill to the center pillar for straining deformation of the corner; and
   a deformation promoting portion provided at an upper portion of the side-sill reinforcement at a specified position which corresponds to said connection portion for prompting deformation of the upper portion of the side-sill reinforcement,
   wherein said deformation promoting portion comprises a weak portion which is provided at an upper face of the side-sill reinforcement and a bending portion which is provided at the upper face of the side-sill reinforcement and causes buckling of the upper face of the side-sill reinforcement.

\* \* \* \* \*